United States Patent [19]

Miyake et al.

[11] 4,376,687
[45] Mar. 15, 1983

[54] NITROGEN-CONTAINING ACRYLIC COPOLYMER COMPOSITION

[75] Inventors: Tetsuya Miyake, Tokyo; Kunihiko Takeda; Akihiko Ikeda, both of Yokohama, all of Japan

[73] Assignee: Asahi Kasei Kogyo Kabushiki Kaisha, Osaka, Japan

[21] Appl. No.: 206,587

[22] Filed: Nov. 13, 1980

[30] Foreign Application Priority Data

Dec. 28, 1979 [JP] Japan ................................ 54/170305
Aug. 5, 1980 [JP] Japan ................................ 55/111832

[51] Int. Cl.³ ...................... C08L 63/00; C25D 13/06
[52] U.S. Cl. ............................. 204/181 C; 525/111; 525/124
[58] Field of Search ............................. 525/111, 124; 204/181 C

[56] References Cited

U.S. PATENT DOCUMENTS 4,251,415  2/1981  Nakada et al. ..................... 525/111

FOREIGN PATENT DOCUMENTS 2041381  8/1980  United Kingdom ................ 525/111

Primary Examiner—Paul Lieberman
Assistant Examiner—Robert E. L. Sellers
Attorney, Agent, or Firm—Sprung, Horn, Kramer & Woods

[57] ABSTRACT

A nitrogen-containing acrylic copolymer composition comprising:
(i) a linear copolymer comprising about 2 to about 90% by weight of recurring units of Formula (A),

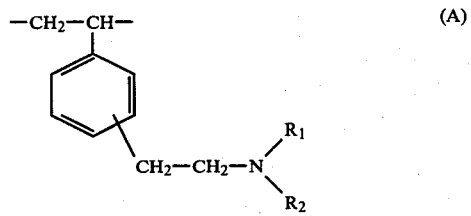

wherein
$R_1$ and $R_2$, which may be the same or different, each represents a hydrogen atom, a $C_{1-20}$ alkyl group, a $C_{3-10}$ cycloalkyl group, a $C_{3-8}$ alkenyl group, a $C_{1-15}$ aminoalkyl group, a $C_{6-20}$ aryl group or a $C_{7-12}$ arylalkyl group, based on the total weight of the linear copolymer, about 10 to about 98% by weight of recurring units of formula (B),

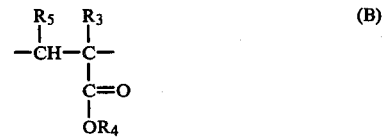

wherein
$R_3$ represents a hydrogen atom, a methyl group, a $C_{1-6}$ alkoxy group, a halogen atom or a $-CH_2COOR_6$ group wherein $R_6$ represents a hydrogen atom, a $C_{1-10}$ alkyl group or a $C_{7-12}$ arylalkyl group,
$R_4$ represents a hydrogen atom, a $C_{1-20}$ alkyl group, a $C_{3-10}$ cycloalkyl group, a $C_{3-10}$ halocycloalkyl group, a $C_{6-20}$ aryl group, a $C_{6-20}$ haloaryl group, a $C_{7-12}$ arylalkyl group, a $C_{1-12}$ haloalkyl group, a $C_{1-12}$ hydroxyalkyl group, a $C_{2-12}$ alkoxyalkyl group, a tetrahydrofurfuryl group, a glycidyl group, a $-(CH_2-CH_2-O)_m R_7$, wherein $R_7$ is a $C_{1-8}$ alkyl group and m is an integer of 1 to 30, or a $C_{3-20}$ dialkylaminoalkyl group, and
$R_5$ represents a hydrogen atom or a $-COOR_8$ group wherein $R_8$ is a hydrogen atom or a $C_{1-20}$ alkyl group, based on the total weight of the linear copolymer and 0 to about 88% by weight of recurring units of at least one of Formulae ($C^1$), ($C^2$) and ($C^3$),

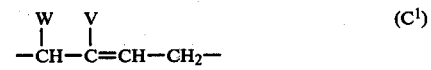

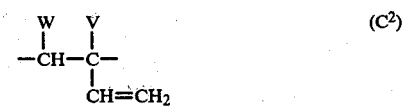

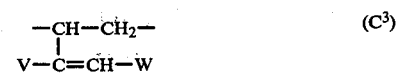

wherein
V and W each independently is a hydrogen atom, a $C_{1-8}$ alkyl group, a phenyl group or a halogen atom,
based on the total weight of the linear copolymer,
(ii) about 0.1 to about 10% by weight of an amine-modified epoxy compound where all or part of the epoxy group has been replaced by the unit of Formula (I),

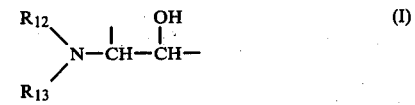

wherein
$R_{12}$ and $R_{13}$ each independently is a hydrogen atom, a $C_{1-20}$ alkyl group, a $C_{3-10}$ cycloalkyl group, a $C_{1-12}$ hydroxyalkyl group, a $C_{1-15}$ aminoalkyl group, a $H-NH-CH_2-CH_2-)_n$ wherein n is an integer of 1 to 8, a $C_{6-15}$ aryl group or a $C_{7-12}$ arylalkyl group,
based on the weight of the linear copolymer and
(iii) about 0.05 to about 12% by weight of a blocked polyisocyanate where all or part of the isocyanate groups has been replaced by an alcohol and/or an amine, based on the weight of the linear copolymer.

44 Claims, No Drawings

NITROGEN-CONTAINING ACRYLIC COPOLYMER COMPOSITION

BACKGROUND OF THE INVENTION

1. Field of the Invention

This invention relates to a composition comprising a nitrogen-containing acrylic copolymer, an amine-modified epoxy compound and a blocked polyisocyanate which can be deposited on a cathode by electrocoating; a cross-linked product obtained from the composition; a coating material comprising the composition; and a method of forming a coating by using the coating material.

2. Description of the Prior Art

The method of depositing a coating substance on the surface of a metallic material to be coated as an electrode by electrophoresis is a so-called electrocoating method and is widely used for coating bodies of automobiles. The electrocoating method is classified into two types, i.e., anodic electrocoating using a material to be coated as an anode and cathodic electrocoating using a material to be coated as a cathode. Of these two the cathodic electrocoating which employs, as a cathode, a metal to be coated has such a great advantage that the metal does not dissolve as an ion. An exemplary composition for cathodic electrocoating which is now employed contains a product obtained by reacting an epoxy compound with a secondary amine to convert the epoxy group to an α-dialkylamino-β-hydroxyethyl group and a blocked polyisocyanate. In this composition the polyisocyanate is half-blocked with the pendent hydroxyl group of the modified epoxy compound.

SUMMARY OF THE INVENTION

The present invention provides a nitrogen-containing acrylic copolymer composition comprising:

(i) a linear copolymer comprising about 2 to about 90% by weight of recurring units of Formula (A),

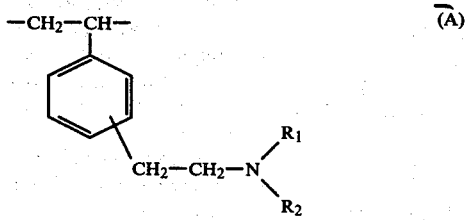

wherein $R_1$ and $R_2$, which may be the same or different, each represents a hydrogen atom, a $C_{1-20}$ alkyl group, a $C_{3-10}$ cycloalkyl group, a $C_{3-8}$ alkenyl group, a $C_{1-15}$ aminoalkyl group, a $C_{6-20}$ aryl group or a $C_{7-12}$ arylalkyl group, based on the total weight of the linear copolymer, about 10 to about 98% by weight of recurring units of Formula (B),

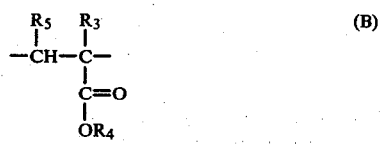

wherein $R_3$ represents a hydrogen atom, a methyl group, a $C_{1-6}$ alkoxy group, a halogen atom or a —$CH_2COOR_6$ group wherein $R_6$ represents a hydrogen atom, a $C_{1-10}$ alkyl group or a $C_{7-12}$ arylalkyl group, $R_4$ represents a hydrogen atom, a $C_{1-20}$ alkyl group, a $C_{3-10}$ cycloalkyl group, a $C_{3-10}$ halocycloalkyl group, a $C_{6-20}$ aryl group, a $C_{6-20}$ haloaryl group, a $C_{7-12}$ arylalkyl group, a $C_{1-12}$ haloalkyl group, a $C_{1-12}$ hydroxyalkyl group, a $C_{2-12}$ alkoxyalkyl group, a tetrahydrofurfuryl group, a glycidyl group, a —$CH_2$—$(CH_2$—$O)_mR_7$, wherein $R_7$ is a $C_{1-8}$ alkyl group and m is an integer of 1 to 30, or a $C_{3-20}$ dialkylaminoalkyl group, and $R_5$ represents a hydrogen atom or a —$COOR_8$ group wherein $R_8$ is a hydrogen atom or a $C_{1-20}$ alkyl group, based on the total weight of the linear copolymer and 0 to about 88% by weight of recurring units of at least one of Formulae $(C^1)$, $(C^2)$ and $(C^3)$,

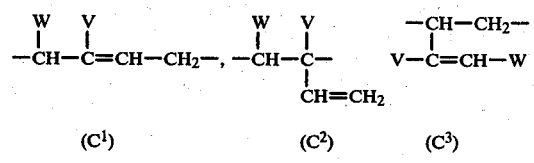

wherein

V and W each independently is a hydrogen atom, a $C_{1-8}$ alkyl group, a phenyl group or a halogen atom, based on the total weight of the linear copolymer, (ii) about 0.1 to about 10% by weight of an amine-modified epoxy compound where all or part of the epoxy groups has been replaced by the unit of Formula (I),

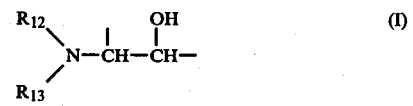

wherein $R_{12}$ and $R_{13}$ each independently is a hydrogen atom, a $C_{1-20}$ alkyl group, a $C_{3-10}$ cycloalkyl group, a $C_{1-12}$ hydroxyalkyl group, a $C_{1-15}$ aminoalkyl group, a H—$(NH$—$CH_2$—$CH_2)_n$, wherein n is an integer of 1 to 8, a $C_{6-15}$ aryl group or a $C_{7-12}$ arylalkyl group, based on the weight of the linear copolymer and (iii) about 0.05 to about 12% by weight of a blocked polyisocyanate where all or part of the isocyanate groups has been replaced by an alcohol and/or an amine, based on the weight of the linear copolymer. In this context the term "alcohol" comprises, in addition, oximes.

DETAILED DESCRIPTION OF THE INVENTION

Specific examples of $R_1$ and $R_2$ in Formula (A) as described above include a hydrogen atom; $C_{1-20}$ alkyl groups such as methyl, ethyl, n-propyl, isopropyl, n-butyl, isobutyl, sec-butyl, tert-butyl, n-pentryl, isopentyl, n-hexyl, n-heptyl, n-octyl, 2-ethylhexyl, n-nonyl, n-dodecyl, n-tetradecyl, n-hexadecyl and n-octadecyl; $C_{3-10}$ cycloalkyl groups such as cyclopropyl, cyclobutyl, cyclopentyl, cyclohexyl, cycloheptyl and cyclooctyl; $C_{3-8}$ alkenyl groups such as allyl, crotyl and hexenyl; $C_{1-15}$ aminoalkyl groups such as aminoethyl, aminopropyl, aminohexyl and aminododecyl; $C_{6-20}$ and preferably $C_{6-15}$ aryl groups such as phenyl, toluyl, trimethylphenyl, diethylphenyl, naphthyl and biphenyl; and $C_{7-12}$ arylalkyl groups such as benzyl, α-phenethyl, β-phenethyl and phenyl-tert-butyl. Of these groups, the $C_{1-20}$ alkyl groups and the $C_{1-15}$ aminoalkyl groups are preferred from the ease in obtaining the starting monomers and it is more preferred to employ $C_{1-8}$ alkyl groups and $C_{1-8}$ aminoalkyl groups. When one of $R_1$ and $R_2$ groups is a hydrogen atom, this hydrogen atom reacts with the blocked polyisocyanate, resulting in an improvement in the performances of a coated film obtained from the composition such as the strength of the coated film. It is preferred to employ such a combination of $R_1$ and $R_2$ groups that one of $R_1$ and $R_2$ is a hydrogen atom and the other is a $C_{1-20}$ alkyl group, especially a $C_{1-8}$ and preferably $C_{2-8}$ alkyl group or a $C_{1-15}$ aminoalkyl group, especially a $C_{1-8}$ and preferably $C_{2-8}$ aminoalkyl groups. Preferred combinations of $R_1$ and $R_2$ groups in Formula (A) include $R_1$=H and $R_2$=$C_2H_5$, n-$C_3H_7$, iso-$C_3H_7$ or n-$C_4H_9$; $R_1$=$R_2$=$CH_3$ or $C_2H_5$; $R_1$=$CH_3$ and $R_2$=$CH_2CH_2NH_2$; and $R_1$=$R_2$=$CH_2CH_2NH_2$.

The

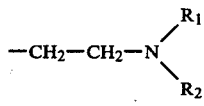

group in Formula (A) which is a pendent group in the linear copolymer of this invention may be in any position to the

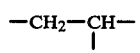

group which is the main chain of the linear copolymer. The copolymers where the

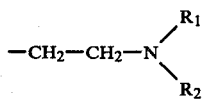

group is in the para position to the

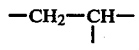

group have such advantages that the preparation of the starting monomers is easy.

Specific examples of $R_3$ in Formula (B) as described above include a hydrogen atom; a methyl group; $C_{1-6}$ alkoxy groups such as methoxy and ethoxy groups; a carboxymethyl group; alkoxycarbonylmethyl groups such as methoxycarbonylmethyl, ethoxycarbonylmethyl, butoxycarbonylmethyl and benzyloxycarbonylmethyl; and halogen atoms such as chlorine atom and bromine atom. Specific examples of $R_6$ include a hydrogen atom; $C_{1-10}$ alkyl groups such as methyl, ethyl and butyl; and $C_{7-12}$ groups such as a benzyl group. Specific examples of $R_4$ include a hydrogen atom; $C_{1-20}$ alkyl groups such as methyl, ethyl, n-propyl, isopropyl, n-butyl, isobutyl, sec-butyl, tert-butyl, n-octyl, 2-ethylhexyl, n-decyl, n-dodecyl, n-hexadecyl and n-octadecyl; $C_{3-10}$ cycloalkyl groups such as cyclohexyl, trimethylcyclohexyl and cyclooctyl; $C_{6-20}$ aryl groups such as phenyl, propylphenyl, butylphenyl, amylphenyl and naphthyl; $C_{7-12}$ arylalkyl groups such as benzyl and triphenylmethyl; $C_{1-12}$ haloalkyl groups such as chloromethyl, chloroethyl, dichloropropyl, bromoethyl, bromopropyl and fluoroethyl; $C_{1-12}$ hydroxyalkyl groups such as hydroxyethyl, bishydroxymethylpentyl and hydroxypropyl; $C_{2-12}$ alkoxylalkyl groups such as methoxymethyl, methoxyethyl, methoxypropyl, methoxybutyl, ethoxyethyl and ethoxypropyl; a tetrahydrofurfuryl group; a glycidyl group; $-(CH_2-CH_2-O)_n R_7$ groups wherein $R_7$ is a methyl group; and $C_{3-20}$ dialkylaminoethyl groups such as dimethylaminoethyl and diethylaminoethyl. Specific examples of $R_5$ include a hydrogen atom and $-COOR_8$ groups wherein $R_8$ is a hydrogen atom, a methyl ethyl or octyl group. Preferred combinations of $R_3$, $R_4$ and $R_5$ groups which are designated ($R_3$, $R_4$, $R_5$) include (H, $CH_3$, H), (H, $C_2H_5$, H), (H, $C_4H_9$, H), (H, $C_8H_{17}$, H), (H, $CH_2CH_2OH$, H), (H, H, H), [H, $CH_2CH_2N(CH_3)_2$, H], [H, $CH_2CH_2N(C_2H_5)_2$, H], ($CH_3$, $CH_3$, H), ($CH_3$, $C_2H_5$, H), ($CH_3$, $C_4H_9$, H), ($CH_3$, $C_8H_{17}$, H), ($CH_3$, $C_{12}H_{25}$, H), ($CH_3$, $C_{18}H_{37}$, H), ($CH_3$, cyclo-$C_6H_{11}$, H), ($CH_3$, H, H), ($CH_3$, $CH_2CH_2OH$, H), [$CH_3$, $CH_2CH_2N(CH_3)_2$, H], [$CH_3$, $CH_2CH_2N(C_2H_5)_2$, H],

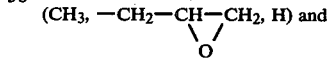

$R_1$, $R_2$, $R_3$, $R_4$, $R_5$, $R_6$, $R_7$ and $R_8$ groups, each is not limited to one kind of the group and may be a mixture of at least two kinds of the groups.

Specific examples of V and W groups in Formulae ($C^1$), ($C^2$) and ($C^3$) as described above include hydrogen atom, $C_{1-8}$ alkyl groups such as methyl and ethyl, a phenyl group and halogen atoms such as chlorine atom and bromine atom. A preferred V group is a hydrogen atom, a methyl group or a chlorine atom and a preferred W group is a hydrogen atom.

Specific examples of $R_{12}$ and $R_{13}$ include a hydrogen atom; $C_{1-20}$ alkyl groups such as methyl, ethyl, propyl, butyl, hexyl, dodecyl and octadecyl; $C_{3-10}$ cycloalkyl groups such as cyclohexyl; $C_{1-12}$ hydroxyalkyl groups such as hydroxyethyl, hydroxypropyl and hydroxyoctyl; $C_{6-15}$ aryl groups such as phenyl and tolyl; $C_{7-12}$ arylalkyl groups such as benzyl; $C_{1-15}$ aminoalkyl groups such as aminoethyl, aminopropyl, aminobutyl, aminohexyl and aminododecyl; and $H-(NH-CH_2-CH_2)_n$ wherein n is an integer of 1 to 4.

Also, part of the recurring units of Formula (B) can be replaced by recurring units of Formula (D), $$-CH_2-\underset{\underset{Z}{|}}{\overset{\overset{Y}{|}}{C}}- \quad (D)$$

wherein
Y is a hydrogen atom, methyl group or a halogen atom such as Cl and Br, and Z is a phenyl group, a nitrile group,

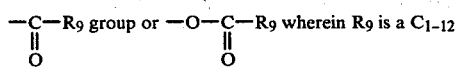 group or 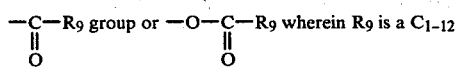 wherein $R_9$ is a $C_{1-12}$ alkyl group such as methyl, ethyl, propyl, butyl, hexyl and octyl or a halogen atom such as Cl and Br, and/or recurring units of Formula (E),

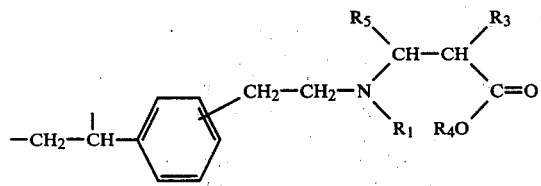

wherein $R_1$, $R_3$, $R_4$ and $R_5$ are the same as defined above.

The amount of the recurring units of Formula (A) typically ranges from about 2 to about 90% by weight, preferably from about 3 to about 70% by weight and more preferably from about 5 to about 40% by weight based on the total weight of the linear copolymer.

The amount of the recurring units of Formula (B) typically ranges from about 10 to about 98% by weight, preferably from 20 to about 97% by weight and more preferably from 30 to about 96% by weight based on the total weight of the linear copolymer.

The amount of the recurring units of at least one of Formulae ($C^1$), ($C^2$) and ($C^3$) typically ranges from 0 to about 88% by weight, preferably from about 2 to 70% by weight and more preferably from about 4 to 50% by weight based on the total weight of the linear copolymer.

The copolymer of this invention can be produced by polymerizing a monomer mixture comprising about 2% to about 90% by weight of a monomer of Formula (A′),

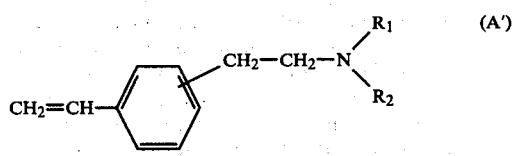

wherein $R_1$ and $R_2$ are the same as defined above, about 10% to 98% by weight of a monomer of Formula (B′),

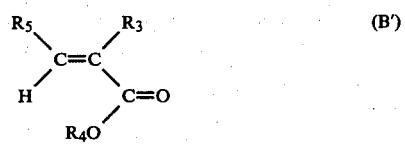

wherein $R_3$, $R_4$ and $R_5$ are the same as defined above, 0 to about 88% by weight of Formula (C),

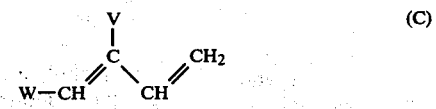

wherein V and W are the same as defined above, and 0 to about 30% by weight by Formula (D′),

wherein Y and Z are the same as defined above, based on the total weight of the monomer mixture.

The monomer of Formula (A′) is prepared by reacting an amine of Formula (F),

wherein $R_1$ and $R_2$ are the same as defined above, with divinylbenzene in the presence of an alkali metal amide of Formula (G),

wherein
$R_1$ and $R_2$ are the same as defined above, and
M is an alkali metal.

The method of preparing the monomer of Formula (C) is described in Makromol. Chem. vol. 177, No. 11, pages 3255–3263 (1976) and vol. 179, pages 2069–2073 (1978), Japanese Patent Application (OPI) 100489/1979 and 11539/1980.

Exemplary monomers of Formula (A′) include [2-(ethylamino)ethyl]styrenes, ]2-(isopropylamino)ethyl]styrenes, [2-(n-propylamino)ethyl]styrenes, [2-(dimethylamino)ethyl]styrenes, [2-(diethylamino)ethyl]styrenes, [2-(sec-butylamino)ethyl]styrenes, [2-(cyclohexylamino)ethyl]styrenes, [2-(allyalamino)ethyl]styrenes, [2-(benzylamino)ethyl]styrenes, [2-[bis(2-aminoethyl)amino]ethyl] styrenes (i.e. $R_1=R_2=CH_2-CH_2-NH_2$) and {[2-(aminoethylmethyl)amino]ethyl} styrenes (i.e. $R_1=CH_3$, $R_2=CH_2-CH_2-NH_2$).

Exemplary monomers of Formula (B′) include unsaturated carboxylic acids such as acrylic, methacrylic, α-chloroacrylic, itaconic, maleic and fumaric acids; acrylates such as alkyl acrylates including methyl, ethyl, butyl and octyl acrylates; cycloalkyl acrylates including cyclohexyl and trimethylcyclohexyl acrylates; aryl acrylates including phenyl and amylphenyl acrylates; haloalkyl acrylates including chloroethyl acrylate, dichloropropyl and bromopropyl acrylates; hydroxyalkyl acrylates including hydroxyethyl and bishydroxymethylpentyl acrylates; alkoxyalkyl acrylates including methoxyethyl and ethoxypropyl acrylates; acrylates of cyclic ethers including glycidyl and tetrahydrofurfuryl acrylates; and dialkylaminoalkyl acrylates including dimethylaminoethyl and diethylaminoethyl acrylates; methacrylates such as alkyl methacrylates including methyl, ethyl, butyl, octyl, decyl and octadecyl methacrylates; cycloalkyl methacrylates including cyclohexyl methacrylate; aryl methacrylates including phenyl, butylphenyl and naphthyl methacrylates; arylalkyl methacrylates including benzyl and triphenylmethyl methacrylates; haloalkyl methacrylates including chloromethyl, fluoroethyl and bromoethyl methacrylates; halocycloalkyl methacrylates including chlorocyclohexyl methacrylate; haloaryl methacrylates including chlorophenyl and tribromophenyl methacrylates; hydroxyalkyl methacrylates including hydroxypropyl methacrylate; alkoxyalkyl methacrylates including ethoxyethyl and methoxybutyl methacrylates; methacrylates of cyclic ethers including glycidyl and tetrahydrofurfuryl methacrylates; dialkylaminoalkyl methacrylates including dimethylaminoethyl and diethylaminoethyl methacrylates and methacrylate of methoxy polyethylene glycol; α-chloroacrylates including butyl and ethoxyethyl α-chloroacrylates; α-alkoxyacrylates including methyl α-methoxyacrylate, cyclohexyl α-ethoxyacrylates; unsaturated dicarboxylates such as itaconates including dibutyl itaconate; fumarates including dimethyl fumarate; maleates including diethyl maleate and dioctyl maleate. Of these compounds, preferred compounds are acrylic acid, methyl acrylate, ethyl acrylate, butyl acrylate, 2-ethylhexyl acrylate, hydroxyethyl acrylate, dimethylaminoethyl acrylate, diethylaminoethyl acrylate, methacrylic acid, methyl methacrylate, ethyl methacrylate, butyl methacrylate, 2-ethylhexyl methacrylate, lauryl methacrylate, octadecyl methacrylate, cyclohexyl methacrylate, dimethylaminoethyl methacrylate, diethylaminoethyl methacrylate, glycidyl methacrylate, hydroxyethyl methacrylate and tetrahydrofurfuryl methacrylate.

Exemplary monomers of Formula (C) include butadiene, isoprene, piperylene, 2-phenylbutadiene, 1-phenylbutadiene and 1,2-dichlorobutadiene Exemplary monomers of Formula (D') include styrene, vinyl chloride, acrylonitrile, vinylidene chloride, methylvinyl ketone and vinyl acetate.

When $R_2$ in the monomers of Formula (A') is a hydrogen atom, addition reaction might be brought about between some monomers of Formula (B') and such monomers of Formula (A') to form monomers of Formula (G),

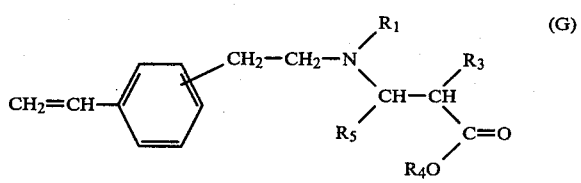

This reaction may occur when $R_1$ in the monomer of Formula (A') is a non-bulky hydrocarbon group such as a n-alkyl group and $R_5$ in the monomer of Formula (B') is a hydrogen atom. When the monomer of Formula (G) is once formed, it acts as a copolymerizable component.

The type of polymerization of this invention may be either ionic polymerization or radical polymerication and it is preferred that the polymerization is carried out in the presence of a radical initiator. The operation of polymerization may be either bulk polymerization or solution polymerization or suspension polymerization or emulsion polymerization.

Exemplary radical initiators which can be employed include azo compounds such as 2,2'-azobisisobutyronitrile, 2,2'-azobis(2,4-dimethyl valeronitrile) and 1,1'-azobiscyclohexane-1-carbonitrile; hydroperoxides such as cumane hydroperoxide and t-butyl hydroperoxide; persulfates such as potassium persulfate and ammonium persulfate; and peroxides such as benzoyl peroxide and lauroyl peroxide.

The molecular weight of copolymers can be controlled by the amount of the radical initiator employed or the solution polymerization using a solvent or a chain transfer agent. With increased amounts of the radical initiator, the molecular weight of copolymers decreases.

The amount of the radical initiator employed ranges from about 0.05 to about 10% by weight based on the total weight of the monomer mixture. A preferred range is from about 0.2 to about 5% by weight.

The solvents or chain transfer agents which can be employed include aromatic hydrocarbons such as toluene, ethylbenzene, cumene and diphenylmethane; halogenated hydrocarbons such as carbon tetrachloride and chloroform; aliphatic alcohols such as n-butanol and isopropanol; and mercaptans such as n-butylmercaptan. The amount of the solvent or the chain transfer agents is not particularly limited. The weight ratio of the solvent or the chain transfer agent to the monomer mixture which can be employed ranges from about 0.05 to about 20 and a preferred weight ratio ranges from about 0.2 to about 10.

The polymerization temperature is from 0° C. to about 150° C. and preferably from 40° C. to 100° C.

The isolation and purification of the copolymer obtained in the above described method from unreacted monomers and optionally the solvent may be conducted by various methods known in this field. In the case of solution polymerization, the reaction mixture is poured into a medium which does not dissolve the formed copolymer to precipitate the copolymer, filtering the copolymer and washing the copolymer with water. Or the reaction mixture is subjected to steam distillation by blowing steam into the reaction mixture under heating to distill the solvent and unreacted monomers. In the case of suspension polymerization, the obtained particle copolymer is separated from the reaction mixture by filtration, sufficiently washed with water to remove the suspending agent and suspending auxiliary agent adhered onto the surface of the copolymer.

The number average molecular weight of the copolymer of this invention is not limited and typically ranges from about 1,000 to about 500,000.

The structure of the obtained copolymer can be confirmed by various conventional methods such as elemental analysis, infrared absorption spectral analysis, NMR spectral analysis. The amount of unreacted monomers after completion of the polymerization is quantitatively analyzed by gas or liquid chromatography and the chemical composition of the copolymer may be calculated from its result. The molecular weight of the copolymer is determined by viscosity measurement, gel permeation chromatography, light-scattering measurement, osmometry and vapor pressure osmometry.

It is preferred to employ the copolymer of this invention dissolved in an appropriate solvents as a starting material for coating.

Exemplary solvents include lower aliphatic alcohols such as ethanol, propanol and butanol; alkoxy alcohols such as ethylene glycol monomethyl ether, ethylene glycol monoethyl ether, ethylene glycol monoisopropyl ether, ethylene glycol monobutyl ether, propylene glycol monomethyl ether, 3-methoxy butanol, diethylene glycol monomethyl ether, diethylene glycol monoethyl ether, diethylene glycol monobutyl ether and dipropylene glycol monomethyl ether; ketones such as methyl ethyl ketone and diacetone alcohol; esters of alkoxy alcohols such as ethylene glycol monomethyl ether acetate, ethylene glycol monobutyl ether acetate, diethylene glycol monomethyl ether acetate, diethylene glycol monoethyl ether acetate and diethylene glycol monobutyl ether acetate; and lactates such as ethyl lactate and butyl lactate.

The epoxy compounds which can be employed as the starting materials for preparing the amine-modified epoxy compounds, i.e., the second component of the composition according to this invention may be any compound having at least one epoxy group and preferably at least two epoxy group. Exemplary epoxy compounds include the following groups of compounds:

(i) The epoxy compounds of Formula (H¹)

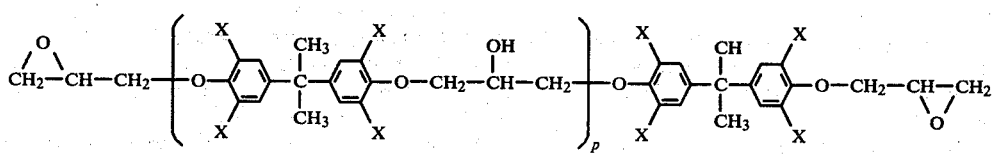

wherein X is a hydrogen atom or a halogen atom such as chlorine and bromine, and p is zero or an integer of 1 to 30.

In Formula (H¹), when X is a hydrogen atom, the epoxy compound is so-called bisphenol A diglycidyl ether which is a representative epoxy compound. Preferred epoxy compounds are tetrachlorobisphenol A diglycidyl ether and tetrabromobisphenol A diglycidyl ether.

(ii) The epoxy compound of Formula (H²),

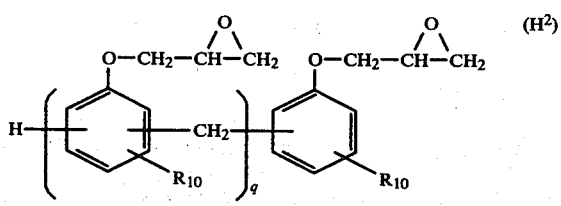

wherein $R^{10}$ is a hydrogen atom or a $C_{1-6}$ alkyl group, and q is an integer of 1 to 15.

Exemplary epoxy compounds of this group include phenol novolak epoxy resins, alkylphenol novolak glycidyl ethers such as o-cresol novolak glycidyl ether.

(iii) The epoxy compound of Formula (H³),

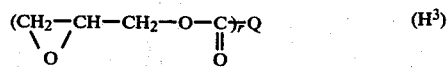

wherein Q is a $C_{1-15}$ r-valent aliphatic hydrocarbon group or a $C_{6-12}$ r-valent aromatic hydrocarbon group; and r is an integer of 2 to 4.

Exemplary epoxy compounds of this group include aliphatic diglycidyl esters such as diglycidyl hexahydrophthalate and diglycidyl adipate and aromatic diglycidyl esters such as diglycidyl phthalate.

(iv) The epoxy compound of Formula (H⁴),

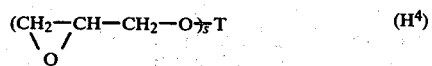

wherein T is a $C_{6-20}$, s-valent aromatic hydrocarbon group, $C_{2-12}$, s-valent aliphatic hydrocarbon group or $C_{7-20}$, s-valent aryl-substituted aliphatic hydrocarbon group; and s is an integer of 2 to 5.

Exemplary epoxy compounds of this group include aliphatic polyglycidyl ethers such as butanediol diglycidyl ether, glycerine triglycidyl ether and pentaglycidyl pentaerythritol; bisphenol F diglycidyl ether, resorcinol diglycidyl ether, hydroquinone diglycidyl ether, catechol diglycidyl ether, tetraphenylethane tetraglycidyl ether and 1,1,5,5-tetraphenylpentane tetraglycidyl ether.

(v) The epoxy compounds of Formula (H⁵),

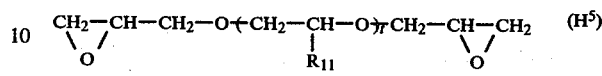

wherein $R_{11}$ is a hydrogen atom or a methyl group; and t is zero or an integer of 1 to 20.

Exemplary epoxy compounds of this group include ethylene glycol diglycidyl ether, propylene glycol diglycidyl ether, polyethylene glycol diglycidyl ether, 1,4-butylene glycol diglycidyl ether, polypropylene glycol diglycidyl ether and diglycidyl ether.

(vi) The epoxy compounds obtained by replacing the —CH=CH— group in aliphatic polyenes with

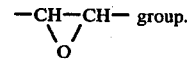 group.

Exemplary epoxy compounds of this group include non-cyclic aliphatic polyoxides such as butadiene diepoxide; cyclic aliphatic polyoxides such as dicyclopentadiene dioxide, vinylcyclohexene dioxide, limonene dioxide, trivinylcyclohexane trioxide and divinylbenzene dioxide; diphenolic acid diglycidyl ether, diglycidyl diphenol; copolymers of glycidyl methacrylate with monomeric compounds such styrene, methyl methacrylate, vinyl chloride, acrylonitrile, vinyl acetate and acrylamide; and nitrogen-containing polyglycidyl compounds such as tetraglycidyl aminodiphenylmethane, triglycidyl isocyanurate and N,N-diglycidyl aniline.

The amine-modified epoxy compounds which can be employed in this invention are the epoxy compounds, all or part of which epoxy groups are replaced by the group of Formula (I),

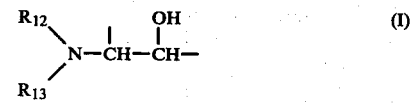

In this Formula (I), $R_{12}$ and $R_{13}$ may be the same or different and each represents a hydrogen atom, a $C_{1-20}$ alkyl group, a $C_{3-10}$ cycloalkyl group, a $C_{1-12}$ hydroxyalkyl group, a $C_{1-15}$ and especially a $C_{1-10}$ aminoalkyl group, $H+NH—CH_2—CH_2)_n$ group wherein n is an integer of 1 to 8, a $C_{6-15}$ aryl group or a $C_{7-12}$ arylalkyl group. Preferred $R_{12}$ and $R_{13}$ are $C_{1-10}$ alkyl groups and $C_{1-10}$ hydroxyalkyl groups. More preferred $R_{12}$ and $R_{13}$ are ethyl groups, propyl groups, hydroxyethyl groups and hydroxypropyl groups.

The amine-modified epoxy compounds of this invention are prepared by reacting the epoxy compound with an amine of Formula (J),

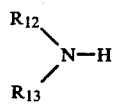

wherein $R_{12}$ and $R_{13}$ are the same as defined above.

Exemplary amines include mono- or di-alkylamines such methylamine, ethylamine, butylamine, hexylamine, dodecylamine, octadecylamine, diethylamine and dipropylamine; mono- or di-alkanolamines such as ethanolamine, propanolamine, octanolamine, diethanolamine and dipropanolamine; alicyclic amines such as cyclohexylamine; alkylenepolyamines such as ethylenediamine, hexamethylenediamine, dodecamethylenediamine, diethylenetriamine, triethylenetetramine, tetraethylenepentamine, propylenediamine, dipropylenetriamine, and butylenediamine; and aromatic amines such as aniline, N-methylaniline, toluidine and benzylamine. Of these amines, dialkylamines and dialkanolamines are preferred, and diethylamine, diethanolamine and dipropanolamine are more preferred.

The amine-modified epoxy compound is obtained by merely mixing the epoxy compound with amine. The reaction can be accelerated by heating. A preferred temperature is about 40° C. to 180° C. and a more preferred temperature is about 60° C. to about 150° C.

The amount of the amine which can be employed is typically about 0.2 to 1.2 mols per epoxy ring of the epoxy compound. A preferred amount of the amine is about 0.4 to about 1.

In this reaction, a solvent may be employed. Exemplary solvents include alcohols such as isopropanol, butanol, ethylene glycol monoethyl ether and diethylene glycol monoethyl ether; esters such as ethyl acetate and cellosolve acetate; and ketones such as methyl ethyl ketone, methyl isobutyl ketone and diacetone alcol.

The amine-modified epoxy compound, one of the starting materials for coating, can be used in a dissolved state, especially if it is solid or highly viscous.

The polyisocyanates which can be employed as the starting materials for preparing the blocked polyisocyanates, i.e., the third component of the composition according to this invention include $C_{4-20}$ polyisocyanate alkanes such as trimethylene diisocyanate, tetramethylene diisocyanate, hexamethylene diisocyanate, 1,2-diisocyanate propane, 1,2-diisocyanate butane, 1,3-diisocyanate butane, decamethylene diisocyanate and 2,2,4-trimethylhexamethylene diisocyanate; $C_{5-18}$ polyisocyanate cycloalkanes such as 1,4-diisocyanate cyclohexane, 1,3-diisocyanate cyclopentane, 1,2-diisocyanate cyclohexane, 2,4-diisocyanate methylcyclohexane, 4,4'-diisocyanate dicyclohexylmethane and isophorone diisocyanate; $C_{8-20}$ polyisocyanate aromatic hydrocarbons such as m-phenylene diisocyanate, p-phenylene diisocyanate, tolylene diisocyanates such as 2,4-tolylene diisocyanate and 2,6-tolylene diisocyanate, xylylene diisocyanate, 1,5-naphthylene diisocyanate, 1,4-mesitylene diisocyanate, 4,4'-biphenylene diisocyanate, triisocyanate benzene, triisocyanate toluene and 3,3'-dimethyl-4,4'-dimethyl-4,4'-diphenylene diisocyanate; and $C_{14-30}$ polyphenylalkane polyisocyanates such as 4,4'-diisocyanate diphenylmethane, 4,4',4''-triisocyanate triphenylmethane and 4,4'-diphenyldimethylmethane-2,2',5,5'-tetraisocyanate; and any mixtures thereof.

Of these polyisocyanates, $C_{4-20}$ and especially $C_{5-18}$ polyisocyanate alkanes and $C_{8-20}$ polyisocyanate aromatic hydrocarbons are preferred, and hexamethylene diisocyanate and tolylene diisocyanates are more preferred.

The blocked polyisocyanate which is also called as capped polyisocyanate is prepared by reacting all or part of the isocyanate groups in the polyisocyanate with an alcohol and/or an amine as a blocking agent. As the alcohol, there may be employed either a monoalcohol having 1 to 20 carbon atoms, preferably 4 to 10 carbon atoms or a polyalcohol having 2 to 20 carbon atoms, preferably 3 to 10 carbon atoms. Such alcohols include aliphatic alcohols, aromatic alcohols and phenols. For example, when a monoalcohol of $B_1$-OH is employed as the blocking agent, the isocyanate group —N=C=O in the polyisocyanate is converted into —NH—CO—$B_1$. As the amine, a primary amine and a secondary amine are preferred and the number of their carbon atoms is preferably 1 to 20. Such amines include aliphatic and aromatic mono- and poly- amines. For example, when an amine of $B_2$—NH—$B_3$ is employed as the blocking agent, the isocyanate group —N=C=O is converted into

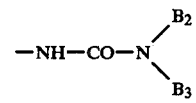

Exemplary alcohols include aliphatic monoalcohols such as methanol, ethanol, butanol, hexanol, 2-ethylhexyl alcohol, dodecanol and octadecyl alcohol; hydroxy tertiary amines such as dimethylaminoethanol and diethylaminoethanol; alkoxymonoalcohols such as ethylene glycol monoethyl ether and ethylene glycol monobutyl ether; aliphatic polyols such as ethylene glycol, glycerine, trimethylolpropane, pentaerythritol and 1,2,6-trihydroxyhexane; polyalkylene glycols such as polyethylene glycol and polypropylene glycol; cycloalkanols such as cyclohexanol and cyclooctanol; phenols such as phenol, cresol and naphthol; phenylalkyl alcohols such as benzyl alcohol and phenetyl alcohol; and oximes such as methyl ethyl ketone oxime, acetone oxime and cyclohexane oxime.

Exemplary amines include diethylamine, dipropylamine, isopropylamine and butylamine.

The blocked polyisocyanates which can be employed in this invention are classified into three groups.

Group (i): Blocked polyisocyanates obtained by reacting a polyisocyanate with a monoalcohol in an amount at least equimolar to the isocyanate group. For example, such blocked polyisocyanates are prepared by reacting a tolylene diisocyanate or hexamethylene diisocyanate with an alcohol such as butanol or octanol in a mol ratio of the diisocyanate to the alcohol of 1 to 2.

Group (ii): Blocked polyisocyanates obtained by reacting a polyisocyanate with a monoalcohol in an amount less than equimolar to the isocyanate group and reacting the obtained partially blocked polyisocyanate with a polyalcohol. For example, such blocked polyisocyanates are prepared by reacting 3 mols of a tolylene diisocyanate with 3 mols of 2-ethylhexyl alcohol to give a half-blocked diisocyanate and reacting the obtained half-blocked diisocyanate with 1 mol of trimethylolpropane.

Group (iii): Blocked polyisocyanate obtained by reacting the partially blocked polyisocyanate as prepared in Group (ii) with an amine-modified epoxy compound. For example, such blocked polyisocyanates are prepared by reacting a reaction mixture of bisphenol A diglycidyl ether and diethylamine with the half-blocked diisocyanate as prepared in Group (ii).

The blocked polyisocyanates which can be employed in this invention can undergo a reaction with an active hydrogen such as a hydroxyl group and an amino group at an elevated temperature of about 100° C. to about 300° C.

The composition of this invention may contain a catalyst for promoting the above described reaction. Any conventional urethane-forming catalyst may be employed and exemplary catalyst include tertiary amines such as triethylamine and triethylene diamine; and metal salts such as iron acetyl acetonate, stannous acetate, tri-n-butyl tin acetate, di-n-butyl tin dichloride, and di-n-butyl tin dilaurate. Of these catalysts, tin compounds are preferred. The amount of the catalyst employed typically ranges from about 0.5 to about 5% by weight based on the total weight of the composition.

In preparing the blocked polysocyanates, a solvent which is inert to the isocyanate group may be employed in order to reduce the viscosity of the reaction product and to prevent the gelling of the reaction product. Exemplary solvents include ethyl acetate, butyl acetate, cellosolve acetate, methyl isobutyl ketone and diethylene glycol dimethyl ether.

In order to ease the handling of the reaction product, a solvent such as an alcohol may be added to the reaction product to render the reaction product uniform after completion of the blocking reaction. Such solvents include isopropanol, butanol and ethylene glycol monoethyl ether. It is also possible to employ an excess amount of a blocking agent, part of which is employed as the solvent.

The weight mixing ratio of the blocked poliisocyanate:the amine-modified epoxy compound:the linear copolymer is typically about 0.1–about 8:about 0.2–about 6:1 and preferably about 0.3–about 4:about 0.4–about 3:1.

The composition of this invention can be converted into a three-dimensioned cross-linked product by the reaction of the blocked polyisocyanate as its one component with its two other components, and the cross-linked product is useful as a molded article and a coated film. It may be considered that in this reaction the blocked isocyanate group reacts with an active hydrogen of the amino group or the hydroxy group in the linear copolymer and/or the amine-modified epoxy group to give a three-dimensional cross-linked product in which a urethane bond or a urea bond is newly formed.

The composition of this invention and its cross-linked product are especially useful as a coated film. The coated film may be obtained by dissolving the composition of this invention in an appropriate solvent, coating the obtained solution on a material to be coated and then evaporating the solvent. A preferred coating method is a cathodic electrocoating method which comprises converting all or part of the recurring units of Formula (A) in the linear copolymer and the unit of Formula (I) in the amine-modified epoxy compound into recurring units of Formula (A") and unit of Formula (I'),

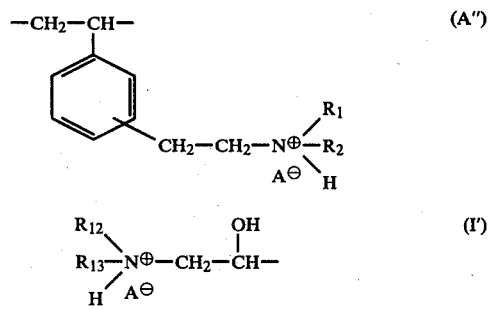

wherein $R_1$, $R_2$, $R_{12}$ and $R_{13}$ are the same as in Formulae (A) and (I), but when at least one of $R_1$, $R_2$, $R_{12}$ and $R_{13}$ groups is a $C_{1-15}$ aminoalkyl group, this $C_{1-15}$ aminoalkyl group becomes a

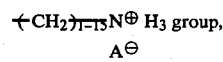

by the reaction between the linear copolymer and/or the amine-modified epoxy compound in the composition of this invention and an acid denoted as HA, dissolving or dispersing the obtained composition into water to form an electrolytic solution and conducting cathodic electrophoresis of the composition onto an electroconductive material, i.e., applying a direct current between a material to be coated as a cathode and an anode in the electrolytic solution.

The acids of HA which can be employed are not particularly limited and include, for example, mineral acids such as hydrochloric acid, sulfuric acid, nitric acid, chromic acid, perchloric acid, phosphoric acid and carbonic acid; aliphatic carboxylic acids such as acetic acid, propionic acid, butyric acid and caproic acid; hydroxycarboxylic acids such as glycolic acid and lactic acid; dicarboxylic acids such as malonic acid and adipic acid; aromatic carboxylic acids such as benzoic acid, phthalic acid and salicylic acid; alkanesulfonic acids such as methanesulfonic acid and ethanesulfonic acid; and arylsulfonic acids such as benzenesulfonic acid, toluenesulfonic acid and laurylbenzenesulfonic acid. Of these acids, the organic carboxylic acids are preferred. From the viewpoint of maintaining the electrolylic solution almost neutral, more preferred acids are acetic acid, lactic acid and hydroxyacetic acid.

The amount of the acid of HA which can be employed is not limited and typically ranges from about 0.1 to about 5 mols per basic nitrogen atom in the composition of this invention. A preferred amount of the acid of HA ranges from about 0.3 to about 2 mols per basic nitrogen atom of the composition of this invention.

In preparing an electrolytic solution, each component of the composition may be employed in the form of a solution. Preferred solvents are the ones as already described with each component of the composition. The concentration of total solids in the obtained solution of the composition which can be employed in this invention typically ranges from about 50 to about 95% by weight and preferably from about 60 to about 90% by weight. In preparing an electrolytic solution, the weight ratio of water to the composition of this invention which can be employed typically ranges from about 1 to about 30 and preferably ranges from about 5 to about 20. It is preferred to slowly add water to the reaction mixture of the composition and the acid under stirring. In conducting an electrocoating, the pH and the specific conductivity of an electrolytic solution are important features. The pH of the electrolytic solution typically ranges from about 3 to about 9 and preferably from about 5 to about 8. The pH of the electrolytic solution is controlled by the kind and amount of the acid selected. The specific conductivity of the electrolytic solution typically ranges from about 200 to about 5,000 $\mu$moh/cm and preferably from about 500 to about 3,000 $\mu$moh/cm. The specific conductivity of the electrolytic solution is controlled by the amount of nitrogen in the linear copolymer and/or the amine-modified epoxy compound, the mixing ratio of the linear copolymer and the amine-modified epoxy compound and the amount of the acid employed.

Exemplary cathode materials, i.e. surfaces of the materials to be coated with the composition of this invention include zinc phosphate-treated sheet steel, iron phosphate-treated sheet steel, untreated sheet steel, galvanized sheet steel, tin-plated sheet steel, aluminum, copper and copper alloy. As the anodes, stainless steel plate or rod and carbon plate or rod are preferred. The voltage between the cathode and the anode is not particularly limited and typically ranges from about 50 V to about 500 V. A preferred voltage is about 100 V to about 400 V. The time of electrodeposition typically ranges from about 10 seconds to about 20 minutes and preferably ranges from about 1 minute to about 10 minutes. The temperature of electrodeposition typically ranges from about 0° C. to about 60° C. and preferably ranges from about 10° C. to about 40° C.

The composition of this invention may additionally contain at least one pigment. Exemplary pigments include red iron oxide, titanium oxide, carbon black, talc, clay, iron oxide, lead oxide, strontium chromate, barium sulfate, cadmium yellow, cadmium red and chrome yellow.

The coated film as such obtained by coating the solution of the composition on a material to be coated and removing the solvent or by cathodic electrocoating can function as a coated film but can be further converted into a three-dimensioned, cross-linked product to form an improved coated film. Any cross-linking method can be employed and it is preferred to heat the coated film at a temperature of about 100° C. to about 250° C. A preferred temperature ranges from about 150° C. to about 220° C.

The obtained coated film shows good strength against chemicals and good weatherability. Especially the resistance to spray with saline water is remarkably high. Furthermore, when a linear copolymer comprising recurring units of at least one of Formulae $(C^1)$, $(C^2)$ and $(C^3)$ is employed, the flexibility of the coated film is markedly improved. Mold articles can be obtained by charging the composition of this invention in a mold and heating the mold to cause cross-linking reaction.

The present invention will now be illustrated in greater detail with reference to several Examples, but they are given for illustrative purposes only and are not to be construed as limiting the invention.

SYNTHESIS I-1 p-[2-(Isopropylamino)ethyl]styrene

In a 2 l three necked flask which was replaced with nitrogen and equipped with a stirrer, a thermometer and a reflux condenser were charged 744 ml of purified tetrahydrofuran from a dropping funnel and then with stirring 86 ml of isopropylamine were added thereto and further 20 ml of 2 N n-butyllithium solution was added to the mixture. The color of the solution is changed from colorless to pale yellow. The flask was placed in a thermostat maintained at 30° C. and with stirring 148 ml of p-divinylbenzene were added to the mixture, whereby the color of the reaction mixture was changed to orange. The reaction was continued under the same conditions for 3 hours. After the reaction, 1 ml of methanol was added to the reaction mixture, and the mixture was added into 2 l of water. Then the obtained solution was extracted twice with n-hexane, and the oil phase was dried on magnesium sulfate overnight, followed by distillation to give 118 g of a distillate exhibiting a boiling point of about 67° C./0.07 mmHg. This distillate was identified as p-[2-(isopropylamino)ethyl]styrene from the following analytical results.

Proton NMR Spectrum:

[100 MHz, solvent CDCl$_3$, standard substance: tetramethylsilane (TMS)]

$\delta$ value: 0.8 (1H), 0.96 (doublet, J=7 Hz, 1H), 2.6–2.9 (multiplet, 5H), 5.1 (doublet, J-11 Hz, 1H), 5.6 (doublet, J=18 Hz, 1H), 6.6 (double doublets, 1H), 7.0–7.35 (multiplet, 4H).

Note: J shows a coupling constant and nH corresponds to n hydrogen atoms.

Infrared Absorption Spectrum (liquid film):

3300, 1630, 1510, 1470, 1380, 1080, 990, 910, 835 cm$^{-1}$

SYNTHESIS I-2 p-[2-(Ethylamino)ethyl]styrene

In a 200 ml stainless steel autoclave equipped with a stirrer, there were charged 80 ml of n-hexane which had been dried over metallic sodium and subjected to distillation. Then, the autoclave was sufficiently cooled externally with a mixture of dry ice-methanol. A bomb containing ethylamine (manufactured by Tokyo Kasei Kogyo Co., Ltd.) was connected to the autoclave and ethylamine was introduced into the autoclave by opening the valve. From the change in weight of the bomb before and after introduction, 6.3 g of ethylamine was confirmed to be introduced. While stirring the mixture, 8.4 ml of 15% n-butyllithium n-hexane solution were introduced. Subsequently, a solution of 18.2 g of p-divinylbenzene dissolved in 40 ml of dry n-hexane was added to the mixture. The autoclave was placed in a water bath maintained at 25° C. and stirring was continued for 5 hours. To the reaction mixture was added 0.5 g of methanol, and the resulting mixture was added into 200 ml of water. The solution thus obtained was extracted twice with n-hexane, and the oil phase was dried on magnesium sulfate overnight, followed by distillation to give 14.7 g of a distillate exhibiting a boiling point of 72° C. to 73° C./0.31 mmHg. This distillate was confirmed to be a single compound by gas chromatography. This distillate was found to have the following analytical results.

Infrared Absorption Spectrum:

3280, 1620, 1510, 1120, 985, 900, 820 cm$^{-1}$

Proton NMR Spectrum:
(100 MHz, solvent CDCl$_3$, standard substance TMS)
δ value: 0.80 (single, 1H), 1.04 (triplet, J=7.2 Hz, 3H), 2.55 (quartet, J=7.2 Hz, 2H), 2.6–2.8 (multiplet, 4H), 5.08 (doublet, J=10.5 Hz, 1H), 5.60 (doublet, J=17.8 Hz, 1H), 6.56 (double doublets, J=10.5, 17.8 Hz, 1H), 6.9–7.3 (multiplet, 4H)

From the above described results, the product is identified as p-[2-(ethylamino)ethyl]styrene.

SYNTHESIS I-3

In a 1 l three necked flask equipped with a stirrer, a thermometer and a dropping funnel were charged 100 g of isopropylamine and the flask was cooled externally with a mixture of ice-water. Then 96 ml of 15% n-butyl-lithium n-hexane solution was added dropwise therto, and subsequently 300 g of commercially available dividylbenzene containing 39% by weight of m-divinylbenzene, 17% by weight of p-divinylbenzene, 29% by weight of m-ethylstyrene, 12% by weight of p-ethylstyrene and 3% by weight of diethylbenzene was added thereto, and the obtained mixture was stirred at 40° C. for 6 hours. After 10 ml of water were added to the reaction mixture, 3.7 l of a 0.5 N hydrochloric acid were mixed with the reaction mixture which was then extracted in a separating funnel. The aqueous phase was washed twice with 300 ml of n-hexane and to the aqueous phase was added a 10 N aqueous sodium hydroxide solution to form an oil phase. This oil phase was subjected to distillation under reduced pressure to give 170 g of a distillate exhibiting a boiling point of 85° C. to 110° C./0.1 mmHg.

SYNTHESIS II-1

In a 2 l separable flask equipped with a stirrer, a thermometer and a reflux condenser were charged 1,014 g of toluene, 102.8 g of methyl methacrylate, 17.7 g of p-[2-(isopropylamino)ethyl]styrene as prepared in Synthesis I-1, 41.7 g of 2-ethylhexyl methacrylate and 2.5 g of 2,2'-azobisisobutyronitrile and the reaction was conducted by heating the mixture at 80° C. for 18 hours with stirring. After the reaction, unreacted monomers were quantitatively analyzed by gas chromatography and it was found that 11.6% of the methyl methacrylate and 12.7% of the 2-ethylhexyl methacrylate were unreacted but that all the p-[2-(isopropylamino)ethyl] styrene was reacted. Then the reaction mixture was subjected to a stream distillation by introducing steam from a steam generator into the mixture to distill off unreacted monomers and toluene. The obtained product was cooled, pulverized and dried to give 130 g of a copolymer. This copolymer (hereinafter "S-II-1") was found to have the following analytical values.

Elemental Analysis: Found (%): C: 65.9, H: 9.1, O: 0.24, N: 0.9.

Infrared Absorption Spectrum:
Characteristic Absorptions: 2930, 1720, 1450, 1280, 1230, 980, 960, 740 cm$^{-1}$ Proton NMR Spectrum (Solvent CDCl$_3$; Standard Substance tetramethylsilane (TMS)]
δ value (ppm): 0.8~1.2 (J=6 Hz), 1.2~1.7, 1.7~2.3 2.7~3.1, 3.65, 3.8~4.1, 6.9~7.3

Intrinsic Viscosity (η) (chloroform solution): 0.049

SYNTHESIS II-2

In the same flask as in Synthesis II-1, were charged 1,250 g of toluene, 103 g of methyl methacrylate, 42 g butyl methacrylate, 18.9 g of p-[2-(isopropylamino)ethyl]styrene as prepared in Synthesis I-1 and 2 g of 2,2'-azobisisobutyronitrile, and the mixture was stirred at 70° C. for 5 hours and further at 80° C. for 5 hours. Then the reaction mixture was subjected to a steam distillation by introducing steam thereinto until the distillate ceased to contain oily substance, and the obtained product was dried to give 135 g of a copolymer. This copolymer (hereinafter "S-II-2") had following analytical values by elemental analysis.

Elemental Analysis: Found (%): C: 64.9, H: 8.7, O: 25.1, N: 1.1.

SYNTHESIS II-3

In a 3 l separable flask were charged 1,890 g of toluene, 103 g of methyl methacrylate, 86 g of methyl acrylate, 28 g of p-[2-(isopropylamino)ethyl]styrene as prepared in Synthesis I-1 and 5 g of 2,2'-azobisisobutyronitrile, and the mixture was stirred at 75° C. for 8 hours. Then the reaction mixture was cooled and poured into 5 l of n-hexane to form white precipitates. The precipitates were separated by filtration and the obtained solid was dried to give a copolymer (hereinafter "S-II-2") having the following analytical values by elemental analysis.

Elemental Analysis: Found (%): C: 61.3, H: 7.9, O: 29.2, N: 1.2.

SYNTHESES II-4 to 14

In a separable flask were charged the monomers, solvent and initiator as set forth in Table 1 and the mixture was subjected to copolymerization under the reaction conditions as set forth in Table 1. The analytical values by elemental analysis of the obtained copolymer are shown in Table 1. The copolymers obtained in Syntheses II-4 to 14 are referred to "S-II-4 to 14", respectively.

TABLE 1

| Syntheses II Nos. | Feed Composition | | | | Reaction Conditions | | | | Elemental Analysis (%) | |
|---|---|---|---|---|---|---|---|---|---|---|
| | Monomers (g) | | Solvent (g) | Initiator (g) | Reaction Apparatus*[8] | Time (hour) | Temperature (°C.) | Isolation Method*[12] | | |
| 4 | p-IAS*[1] | 11.3 | Cumene 1,300 | 2,2'-Azobisiso-butyronitrile 7.5 | A*[9] | 18 | 80 | SD*[13] | C: | 69.6 |
| | Methyl methacrylate | 47 | | | | | | | H: | 10.2 |
| | | | | | | | | | O: | 19.6 |
| | n-Octyl methacrylate | 93.1 | | | | | | | N: | 0.6 |
| 5 | p-IAS*[1] | 53 | Carbon tetra-chloride 4,080 | 2,2'-Azobisiso-butyronitrile 7 | B*[10] | 15 | 70 | RP*[14] | C: | 64.6 |
| | Methyl methacrylate | 100 | | | | | | | H: | 8.6 |
| | | | | | | | | | O: | 24.8 |
| | Ethyl acrylate | 152 | | | | | | | N: | 1.9 |
| 6 | p-IAS*[1] | 26.5 | Isopropanol 1,300 | 2,2'-Azobisiso-butyronitrile 5 | " | " | " | " | C: | 62.9 |
| | Methyl methacrylate | 80 | | | | | | | H: | 8.1 |
| | | | | | | | | | O: | 28.0 |

TABLE 1-continued

| Syntheses II Nos. | Feed Composition Monomers (g) | | Solvent (g) | Initiator (g) | Reaction Conditions Reaction Apparatus[8] | Time (hour) | Temperature (°C.) | Isolation Method[12] | Elemental Analysis (%) | |
|---|---|---|---|---|---|---|---|---|---|---|
| 7 | Ethyl acrylate p-IAS[1] Methyl methacrylate | 140 21.9 80 | Cumene 2,600 | 2,2'-Azobisiso- butyronitrile 7 | " | " | " | " | N: C: H: O: | 1.0 61.8 8.2 28.2 |
| 8 | Ethyl acrylate p-IAS[1] Methyl methacrylate | 140 56.7 30 | n-Hexane 500 | 2,2'-Azobisiso- butyronitrile 2.6 | C[11] | 18 | " | CR[15] | N: C: H: O: | 0.9 71.1 8.9 15.9 |
| 9 | m-EAS[2] Ethyl acrylate | 50 50 | Toluene 340 | 2,2'-Azobisiso- butyronitrile 2 | " | " | " | SD[13] | N: C: H: O: | 4.0 71.6 9.0 15.3 |
| 10 | p-DMAS[3] Hydroxyethyl methacrylate Cyclohexyl methacrylate | 50 30 30 | Toluene 269 | 2,2'-Azobisiso- butyronitrile 2 | " | " | " | " | N: C: H: O: | 4.2 70.7 8.8 16.2 |
| 11 | p-DEAS[4] Hydroxyethyl acrylate | 60 40 | Toluene 293 | 2,2'-Azobisiso- butyronitrile 2 | " | " | " | " | N: C: H: O: | 3.7 71.0 9.1 15.6 |
| 12 | p-AAS[5] methyl acrylate | 25 50 | Benzene 500 | Benzoyl peroxide 2 | " | 20 | 60 | " | N: C: H: O: | 4.3 70.3 9.0 18.2 |
| 13 | Butyl acrylate m-IAS[6] N,N—diethylamino- ethyl methacrylate | 25 4 30 | Benzene 500 | Lauroyl peroxide 1 | " | " | " | " | N: C: H: O: | 2.5 66.2 9.7 21.4 |
| 14 | Butyl acrylate p-EAS[7] Tetrahydrofurfuryl methacrylate Methyl methacrylate | 66 14 56 30 | Benzene 500 | 1,1'-Azobiscylo- hexanecarbonitrile 2 | " | " | " | " | N: C: H: O: N: | 2.6 64.2 8.1 26.5 1.2 |

Notes:
[1] p-IAS: p-[2-(Isopropylamino)ethyl]styrene
[2] m-EAS: m-[2-(Ethylamino)ethyl]styrene
[3] p-DMAS: p-[2-(Dimethylamino)ethyl]styrene
[4] p-DEAS: p-[2-(Diethylamino)ethyl]styrene
[5] p-AAS: p-[2-(Allylamino)ethyl]styrene
[6] m-IAS: m-[2-(Isopropylamino)ethyl]styrene
[8] Reaction Apparatus: Glass separable flask equipped with a thermometer, a stirrer and a dropping funnel
Volume of Reaction Apparatus
[9] A: 2 l
[10] B: 5 l
[11] C: 1 l
[12] Isolation Method
[13] SD: The same steam distillation as in Synthesis II-1
[14] RP: Reprecipitation by pouring the reaction mixture into hexane of a volume three times as much as the volume of the reaction mixture, followed by filtration
[15] CR: Cooling of the reaction mixture with a mixture of dry ice-methanol and filtration of the formed precipitates

SYNTHESIS II-15

In a 1 l stainless steel autoclave equipped with a stirrer were charged 450 g of toluene, 48 g of methyl methacrylate, 15 g of p-[2-(isopropylamino)ethyl]styrene as prepared in Synthesis I-1, 31.4 g of methyl acrylate and 2 g of 2,2'-azobisisobutyronitrile and then 5.6 g of 1,3-butadiene were introduced thereinto under pressure and the obtained mixture was stirred at 80° C. for 18 hours. After the autoclave was externally cooled with a mixture of ice-water, unreacted monomers were quantitatively analyzed by gas chromatography, and it was found that 21.2% of the methyl methacrylate, 46% of the methyl acylate, 4.3% of the p-[2-(isopropylamino)ethyl]styrene and 1% of the 1,3-butadiene were unreacted. Then the reaction mixture was poured into a 3 l separable flask and subjected to a steam distillation by introducing steam thereinto to distill off unreacted monomers and toluene. The obtained product was cooled, pulverized and dried to give 70 g of a copolymer (hereinafter "S-II-15"). This copolymer had the following analytical values by elemental analysis. Elemental Analysis:

Found (%): C: 65.0, H: 8.8, O: 25.2, N: 1.5

SYNTHESIS II-16 to 21

In the same apparatus as in Synthesis II-15 were charged the monomers, solvent and initiator as set forth in Table 2 and copolymerization and post-treatment were conducted in the same manner as in Synthesis II-15. The analytical values by elemental analysis of the obtained copolymer are shown in Table 2. The copolymers obtained in Syntheses II-16 to 21 are hereinafter referred to S-II-16 to 21.

TABLE 2

| Syntheses Nos. | Feed Composition | | | | | Reaction Conditions | | Elemental Analysis (%) | |
|---|---|---|---|---|---|---|---|---|---|
| | Monomers (g) | | Solvent (g) | | Initiator (g) | Time (hour) | Temperature (°C.) | | |
| 16 | p-EAS*1 | 12 | Cumene | 400 | 2,2'-Azobisiso-butyronitrile 2 | 18 | 80 | C: H: O: N: | 70.6 10.0 18.4 1.1 |
| | n-Butyl acrylate | 73 | | | | | | | |
| | Isoprene | 15 | | | | | | | |
| 17 | p-DMAS*2 | 20 | Toluene | 600 | 2,2'-Azobisiso-butyronitrile 2 | " | " | C: H: O: N: | 65.7 8.3 22.4 2.1 |
| | Hydroxyethyl methacrylate | 20 | | | | | | | |
| | Methyl acrylate | 50 | | | | | | | |
| | Butadiene | 10 | | | | | | | |
| 18 | p-CAS*3 | 15 | Chlorobenzene | 500 | 2,2'-Azobisiso-butyronitrile 2 | 24 | 75 | C: H: O: N: Cl: | 65.2 9.1 21.9 0.9 4.3 |
| | Ethyl methacrylate | 50 | | | | | | | |
| | Ethyl acrylate | 25 | | | | | | | |
| | Chloroprene | 10 | | | | | | | |
| 19 | p-AAS*4 | 10 | Isopronanol | 200 | Lauroyl peroxide 1 | " | " | C: H: O: N: | 67.2 8.4 21.9 1.7 |
| | Methyl acrylate | 60 | | | | | | | |
| | Dimethylaminoethyl methacrylate | 10 | | | | | | | |
| | Butadiene | 20 | | | | | | | |
| 20 | p-IAS*5 | 15 | Toluene | 430 | 2,2'-Azobisiso-butyronitrile 2 | 18 | 80 | C: H: O: N: | 66.3 8.1 23.8 1.2 |
| | Methyl methacrylate | 45 | | | | | | | |
| | Methyl acrylate | 30 | | | | | | | |
| | Butadiene | 10 | | | | | | | |
| 21 | p-IAS*5 | 15 | Toluene | 400 | 2,2'-Azobisiso-butyronitrile 2 | 18 | 80 | C: H: O: N: | 70.7 9.5 19.0 1.2 |
| | Methyl methacrylate | 39 | | | | | | | |
| | Methyl acrylate | 26 | | | | | | | |
| | Butadiene | | | | | | | | |

Notes:
*1p-EAS: p-[2-(Ethylamino)ethyl]styrene
*2p-DMAS: p-[2-(Dimethylamino)ethyl]styrene
*3p-CAS: p-[2-(Cyclohexylamino)ethyl]styrene
*4p-AAS: p-[2-(Allylamino)ethyl]styrene
*5p-IAS: p-[2-(Isopropylamino)ethyl]styrene

SYNTHESIS II-22

In a 1 l pressure-resistant glass bottle were charged 400 g of ethylbenzene, 80 g of methyl methacrylate, 50 g of 2-ethylhexyl methacrylate and 2 g of 2,2'-azobisisobutyronitrile and the bottle was plugged with a rubber stopper over which a crown-type, pressure-resistant stopper having a hole was further plugged. Then 10.2 g of 1,3-butadiene was injected through a syringe needle from a bomb into the glass bottle, and the contents were magnetically stirred at 75° C. for 16 hours. After the glass bottle was cooled, the reaction mixture was subjected to a steam distillation and the obtained product was cooled, pulverized and dried. The copolymer thus obtained (hereinafter "S-II-22") had the following analytical values by elemental analysis.

Elemental Analysis: Found (%): C: 75.1, H: 10.1, O: 13.2, N: 1.9.

SYNTHESES II-23 to 29

In the same manner as in Synthesis II-23, copolymerization and post-treatment were conducted. The feed composition, reaction conditions and analytical values by elemental analysis of the obtained copolymer are shown in Table 3. The copolymers obtained in Syntheses II-23 to 29 are hereinafter referred to S-II-23 to 29, respectively.

TABLE 3

| Syntheses Nos. | Feed Composition | | | | | Reaction Conditions | | Elemental Analysis (%) | |
|---|---|---|---|---|---|---|---|---|---|
| | Monomers (g) | | Solvent (g) | | Initiator (g) | Time (hour) | Temperature (°C.) | | |
| 23 | m-IAS*1 | 20 | Benzene | 500 | 2,2'-Azobisiso-butyronitrile 2 | 18 | 75 | C: H: O: N: | 74.8 11.2 13.0 1.8 |
| | Butyl methacrylate | 50 | | | | | | | |
| | Piperylene | 30 | | | | | | | |
| 24 | p-EAS*2 | 15 | Isopropanol | 600 | 1,1'-Azobiscyclo-hexanecarbonitrile 2 | " | " | C: H: O: N: | 80.3 9.0 9.1 1.7 |
| | Cyclohexyl methacrylate | 25 | | | | | | | |
| | Phenyl methacrylate | 20 | | | | | | | |
| | Butadiene | 40 | | | | | | | |
| 25 | p-NAS*3 | 15 | Toluene | 500 | 2,2'-Azobisiso-butyronitrile 2 | " | " | C: H: O: N: | 76.5 9.9 11.9 1.8 |
| | Dimethyl itaconate | 25 | | | | | | | |
| | Butadiene | 60 | | | | | | | |
| 26 | p-BAS*4 | 15 | n-Hexane | 400 | 2,2'-Azobisiso-butyronitrile 2 | " | " | C: H: O: N: | 77.2 11.6 8.9 3.4 |
| | Dodecyl Methacrylate | 75 | | | | | | | |
| | Butadiene | 20 | | | | | | | |
| 27 | p-IAS*5 | 30 | Toluene | 400 | Benzoyl peroxide 1 | 24 | 80 | C: H: O: N: | 72.9 10.3 14.0 2.6 |
| | Butyl acrylate | 30 | | | | | | | |
| | Butyl methacrylate | 35 | | | | | | | |
| | Butadiene | 5 | | | | | | | |
| 28 | p-DMAS*6 | 40 | Cumene | 600 | 2,2'-Azobisiso-butyronitrile 2 | " | " | C: H: O: | 72.3 8.4 16.2 |
| | Glycidyl methacrylate | 10 | | | | | | | |
| | Methyl acrylate | 40 | | | | | | | |

TABLE 3-continued

| Syntheses Nos. | Feed Composition | | | Reaction Conditions | | Elemental Analysis (%) |
|---|---|---|---|---|---|---|
| | Monomers (g) | Solvent (g) | Initiator (g) | Time (hour) | Temperature (°C.) | |
| 29 | Butadiene 10<br>p-IAS*5 20<br>Butyl acrylate 40<br>Dimethyl fumarate 30<br>Isoprene 10 | Ethylbenzene 600 | 2,2'-Azobisiso-butyronitrile 2 | " | " | N: 3.6<br>C: 65.1<br>H: 8.9<br>O: 23.0<br>N: 1.9 |

Note:
*1m-IAS: m-[2-(Isopropylamino)ethyl]styrene
*2p-EAS: p-[2-(Ethylamino)ethyl]styrene
*3p-NAS: p-[2-(n-Propylamino)ethyl]styrene
*4p-BAS: p-{2-[Bis(2-aminoethyl)amino]ethyl}styrene
*5p-IAS: p-[2-(Isopropylamino)ethyl]styrene
*6p-DMAS: p-[2-(Dimethylamino)ethyl]styrene

SYNTHESIS II-30

In a 3 l three necked flask equipped with a stirrer, a reflux condenser and a thermometer were charged 30 g of p-[2-(benzylamino)ethyl]-styrene, 30 g of methyl acrylate, 20 g of chloroethyl methacrylate and 20 g of 2-phenyl butadiene and then 500 g of benzene in which 2 g of 2,2'-azobisisobutyronitrile had been dissolved. The mixture was refluxed for 10 hours with stirring, and after the reaction, the reaction mixture was subjected to a steam distillation and the product separated was dried to give a copolymer (hereinafter "S-II-30"). The analytical values by elemental analysis of this copolymer are as follows:

Elemental Analysis: Found (%): C: 71.8, H: 7.0, O: 14.1, N: 2.2, Cl: 5.4.

SYNTHESIS II-31

In the same apparatus as in Synthesis II-22 were charged 18 g of the monomers as obtained in Synthesis I-3, 54 g of methyl methacrylate, 36 g of methyl acrylate and 13.2 g of butadiene and then 360 g of isopropanol in which 2 g of 2,2'-azobisisobutyronitrile had been dissolved, and copolymerization was conducted in the same manner as in Synthesis II-22. The reaction mixture was cooled externally and poured into 3 l of n-hexane, and the precipitates formed were separated and dried in vacuo to give a copolymer (hereinafter "S-II-31"). The analytical values by elemental analysis of this copolymer are as follows:

Elemental Analysis: Found (%): C: 67.6, H: 8.2, O: 23.4, N: 1.4.

SYNTHESIS III-1

In a 1 l three necked flask equipped with a stirrer, a thermometer and a dropping funnel were charged 285 g of bisphenol A diglycidyl ether type epoxy resin having an epoxy equivalent of 450 to 500 ("AER 661", manufactured by Asahi Kasei Kogyo K.K.) as an epoxy compound and 147 g of isopropanol as a solvent. Then the mixture was stirred until it became homogeneous, and 56.7 g of diethanolamine as an amine was added dropwise while the temperature was maintained at 80° C. After the addition of the amine, the mixture was further stirred for 3 hours to give an amine-modified epoxy compound (hereinafter "S-III-1").

SYNTHESIS III-2 TO 9

Various amine-modified epoxy compounds were prepared by employing the feed compositions as set forth in Table 4 in the same manner as in Synthesis III-1.

TABLE 4

| Synthesis III No. | Epoxy Compound (g) | Amine (g) | Solvent (g) |
|---|---|---|---|
| 2 | AER 337*1 253 | Diethylamine 66 | Isopropanol 80 |
| 3 | AER 664*2 425 | Diethanolamine 55 | n-Butanol 220 |
| 4 | AER 661*3 230 | Diisopropylamine 40 | Ethylene glycol monoethyl ether 120 |
| 5 | AER 661*3 240 | Diethylenetriamine 52 | Isopropanol 125 |
| 6 | AER 771*4 240 | Diethanolamine 42 | Methyl ethyl ketone 90 |
| 7 | DEN 431*5 175 | Diethylamine 66 | Isopropanol 80 |
| 8 | Diglycidyl ester of dimer acid 334 | Diethanolamine 95 | Ethylene glycol monoethyl ether 185 |

Note:
*1Bisphenol A diglycidyl ether type epoxy resin having an epoxy equivalent of 225 to 280, manufactured by Asahi Kasei Kogyo K.K.
*2Bisphenol A diglycidyl ether type epoxy resin having an epoxy equivalent of 900 to 1,000, manufactured by Asahi Kasei Kogyo K.K.
*3The same as in Synthesis III-1.
*4Tetrabromobisphenol A diglycidyl ether type epoxy resin having an epoxy equivalent of 445 to 520 and a bromine content of 21%, manufactured by Asahi Kasei Kogyo K.K.
*5Phenol novolak type epoxy resin having an epoxy equivalent of 172 to 179, manufactured by Dow Chemical Co.
*6Polypropylene glycol diglycidyl ether having an epoxy equivalent of 305 to 335, manufactured by Dow Chemical Co.

The amine-modified epoxy compounds obtained in Syntheses III-2 to 9 are hereinafter referred to "S-III-2 to 9", respectively.

SYNTHESIS IV-1

In a 1 l three necked flask equipped with a stirrer, a thermometer and a dropping funnel were charged 174 g of tolylene dissocyanate which was a mixture of 20% by weight of 2,6-isomer and 80% by weight of 2,4-isomer, and then 130 g of 2-ethylhexyl alcohol was added dropwise thereto at a temperature of 30° C. to 40° C. over a period of one hour with stirring. After the addition of the tolylene dissocyanate, the mixture was further stirred for two hours. It was confirmed that the characteristic absorptions at 2240 to 2270 cm$^{-1}$ due to the isocyanate group disappeared at the measurement of the infrared absorption spectrum of the reaction mixture. Then 44.7 g of trimethylolpropane were added dropwise to the reaction mixture, and the obtained mixture was stirred at 80° C. for 30 minutes. After one drop of dibutyltin dilaurate was added thereto, the resulting mixture was further stirred for 30 minutes and 87.2 g of ethylene glycol monoethyl ether were added to the reaction mixture to give a homogeneous solution of the block polyisocyanate (hereinafter "S-IV-1").

SYNTHESIS IV-2

In a 500 ml three necked flask were charged 100 g of 2,4-tolylene dissocyanate. Then 160 g of 2-ethylhexyl alcohol as the blocking agent was added dropwise thereto while the temperature was maintained at 80° C., and the mixture was further stirred for two hours. After disappearance of the characteristic absorptions due to the isocyanate group was confirmed by the infrared absorption spectrum of the reaction mixture, 110 g of isopropanol as the solvent were added to the reaction mixture to give a homogeneous solution of the block polyisocyanate (hereinafter "S-IV-2").

SYNTHESES IV-3 TO 7

Various block polyisocyanates were prepared by using the apparatus as in Synthesis IV-2 in the same manner as in Synthesis IV-2. The feed materials and their amount employed are shown in Table 5.

TABLE 5

| Synthesis IV No. | Diisocyanate (g) | Blocking Agent (g) | Solvent (g) |
|---|---|---|---|
| 3 | Tolylene diisocyanate (20:80 weight mixture of 2,6- and 2,4-isomers) 87 | n-Octanol 130 | Isopropanol 93 |
| 4 | Hexamethylene diisocyanate 84 | n-Butanol 74 | Ethylene glycol monomethyl ether 68 |
| 5 | m-Xylylene diisocyanate 94 | Phenol 94 | Ethylene glycol monomethyl ether 80 |
| 6 | 2,4-Tolylene diisocyanate 174 | n-Hexanol 204 | Isopropanol 130 |
| 7 | Isophorone diisocyanate 179 | Isopropanol 120 | Ethylene glycol monoethyl ether 128 |

The block polyisocyanates obtained in Syntheses IV-3 to 7 are hereinafter referred to "S-IV-3 to 7", respectively.

EXAMPLE 1

In a 500 ml separable flask were added 50 g of the linear copolymer of S-II-1 and 21 g of ethylene glycol as the solvent and the mixture was rendered homogeneous. Then 125 g of the block polyisocyate of S-IV-1 and 100 g of the amine-modified epoxy compound of S-III-1 were added thereto and the obtained mixture was rendered sufficiently homogeneous with stirring. After 6.6 g of dibutyltin dilaurate were added thereto, the mixture was further stirred and then 8.9 g of lactic acid having a purity of 72% were added thereto, followed by gradual addition of 200 ml of ion-exchanged water thereto with stirring. Subsequently, the contents of the flask was poured into a 2 l of beaker and 1,340 ml of water was added thereto with stirring to give an white emulsion having a pH of 5.9 and a specific conductivity of 2,200 μmho/cm.

In this emulsion were placed a 150 mm × 70 mm × 0.8 mm zinc phosphate-treated steel plate as the cathode and a stainless steel anode and a direct current was applied to the emulsion at a voltage of 250 V between the two electrodes for 3 minutes. While the electrolytic solution was stirred by a magnet stirrer at a temperature of 30° C. to 33° C. A white and uniform coating was formed on the stainless steel. The coated stainless steel plate was then washed sufficiently with water, dried in air and heated at 175° C. for 20 minutes to give a lustrous, unform coating. When the coating was strongly rubbed with absorbent cotton containing acetone, no dissolution of the coating material, no loss of luster and no scratch were observed. The obtained coating had the following properties.

| | |
|---|---|
| Thickness of Coating (μ): | 12 |
| Erichsen (mm)[*1]: | 7.8 |
| Du Pont Impact Strength (cm)[*2]: | 50 |
| (1 Kg × ½ inch) | (satisfactory) |
| Pencil Hardness: | 3H |
| Crosscut Test (remainder/100)[*3]: | 100 |

Note
[*1]JIS Z-2247
[*2]JIS K-5400
[*3]JIS K-5400

EXAMPLES 2 TO 34

Electrodeposition was conducted with various electrolytic solutions in the same manner as in Example 1. The types and amounts of the linear copolymers, solvents, block polyisocyanates, amine-modified epoxy compounds, catalysts, acids and water employed in the preparation of the electrolytic solutions for electrodeposition and their properties are set forth in Table 6. The obtained coatings were heated at 175° C. for 20 minutes to give uniform coatings. The properties of the coatings thus obtained are set forth in Table 6.

TABLE 6

| Example No. | Linear Copolymer (g) | Solvent (g)[*1] | Block Polyisocyanate (g) | Amine-modified Epoxy Compound (g) | Catalyst (g)[*2] | Acid (g)[*3] | Water (g) | pH | Electrolytic Solution Specific Conductivity (μmho/cm) | Thickness of Coating (μ) | Erichsen (mm) | Pencil Hardness |
|---|---|---|---|---|---|---|---|---|---|---|---|---|
| 2 | S-II-1 75 | a 19 | S-IV-2 72 | S-III-2 50 | e 3.2 | j 4.5 | 1,200 | 6.0 | 2,400 | 12 | 7.0 | 2H |
| 3 | S-II-2 50 | a 13 | S-IV-3 72 | S-III-1 50 | e 4.1 | i 4.5 | 1,070 | 5.9 | 1,500 | 11 | 8.5 | 3H |
| 4 | S-II-2 62.5 | a 27 | S-IV-4 72 | S-III-3 102 | e 4.5 | j 6.3 | 1,180 | 5.8 | 1,300 | 13 | 7.4 | 3H |
| 5 | S-II-3 75 | b 25 | S-IV-1 63 | S-III-4 50 | f 5.0 | j 10.1 | 1,280 | 5.7 | 2,200 | 15 | 7.7 | 2H |
| 6 | S-II-3 50 | b 8 | S-IV-5 143 | S-III-6 79 | e 7.0 | j 11.2 | 1,400 | 5.7 | 2,500 | 12 | 8.0 | 3H |
| 7 | S-II-4 100 | a 43 | S-IV-1 125 | S-III-5 114 | e 8.4 | j 12.4 | 1,870 | 5.9 | 1,700 | 10 | 8.0 | 3H |
| 8 | S-II-5 75 | a 19 | S-IV-2 73 | S-III-2 50 | e 5.5 | i 6.5 | 1,840 | 6.0 | 2,000 | 10 | 7.5 | 2H |

TABLE 6-continued

| Example No. | Linear Copolymer (g) | Solvent (g)*1 | Block Polyisocyanate (g) | Amine-modified Epoxy Compound (g) | Catalyst (g)*2 | Acid (g)*3 | Water (g) | pH | Electrolytic Solution Specific Conductivity (μmho/cm) | Thickness of Coating (μ) | Erichsen (mm) | Pencil Hardness |
|---|---|---|---|---|---|---|---|---|---|---|---|---|
| 9 | S-II-6 100 | b 25 | S-IV-6 135 | S-III-1 100 | f 8.1 | k 7.6 | 1,800 | 5.9 | 1,800 | 13 | 8.0 | 3H |
| 10 | S-II-7 25 | c 9 | S-IV-7 72 | S-III-7 40 | e 4.2 | j 8.7 | 1,100 | 6.0 | 2,200 | 15 | 8.5 | 3H |
| 11 | S-II-8 25 | c 10 | S-IV-2 72 | S-III-8 57 | e 3.5 | i 4.8 | 1,440 | 6.0 | 2,000 | 15 | 7.0 | 3H |
| 12 | S-II-9 25 | a 6 | S-IV-1 63 | S-III-9 57 | e 4.6 | j 9.0 | 1,200 | 6.2 | 2,200 | 18 | 7.5 | 2H |
| 13 | S-II-10 25 | b 6 | S-IV-1 63 | S-III-1 50 | g 3.5 | i 4.0 | 1,100 | 5.9 | 2,100 | 17 | 7.3 | 2H |
| 14 | S-II-11 25 | d 6 | S-IV-2 72 | S-III-2 50 | e 6.0 | j 16.4 | 1,600 | 6.9 | 2,400 | 12 | 7.3 | 3H |
| 15 | S-II-12 25 | d 10 | S-IV-3 72 | S-III-3 88 | e 10.5 | j 12.1 | 1,400 | 5.6 | 2,500 | 10 | 8.3 | 3H |
| 16 | S-II-13 25 | a 9 | S-IV-1 63 | S-III-1 43 | h 3.2 | j 6.5 | 1,100 | 5.8 | 1,600 | 15 | 8.5 | 2H |
| 17 | S-II-14 50 | b 17 | S-IV-1 63 | S-III-1 50 | e 5.5 | i 4.1 | 1,100 | 5.7 | 2,300 | 12 | 8.0 | 2H |
| 18 | S-II-15 50 | a 21 | S-IV-1 62.5 | S-III-1 85 | e 4.1 | j 7.4 | 945 | 6.2 | 1,630 | 12 | 9.3 | 2H |
| 19 | S-II-22 50 | a 21 | S-IV-1 100 | S-III-2 50 | e 4.8 | i 6.3 | 1,680 | 5.8 | 2,100 | 12 | 9.1 | HB |
| 20 | S-II-16 50 | a 21 | S-IV-2 114 | S-III-3 74 | e 5.4 | j 5.5 | 1,260 | 6.2 | 1,090 | 15 | 8.9 | HB |
| 21 | S-II-17 50 | b 23 | S-IV-3 143 | S-III-4 143 | f 7.5 | i 6.5 | 1,750 | 6.3 | 2,050 | 18 | 8.6 | 2H |
| 22 | S-II-18 50 | a 20 | S-IV-2 85 | S-III-2 50 | g 4.5 | k 7.7 | 1,570 | 5.9 | 1,800 | 16 | 8.6 | 2H |
| 23 | S-II-19 50 | c 23 | S-IV-1 88 | S-III-1 71 | e 5.1 | j 11.1 | 1,490 | 5.7 | 1,800 | 13 | 9.1 | HB |
| 24 | S-II-20 50 | d 26 | S-IV-1 63 | S-III-1 50 | h 4.1 | j 6.2 | 950 | 6.3 | 1,310 | 15 | 8.3 | 3H |
| 25 | S-II-21 50 | b 21 | S-IV-1 63 | S-III-1 50 | e 4.1 | j 5.5 | 950 | 6.2 | 1,240 | 16 | 9.2 | HB |
| 26 | S-II-23 50 | a 21 | S-IV-1 63 | S-III-5 71 | e 4.5 | j 7.6 | 1,320 | 6.5 | 1,440 | 18 | 9.1 | 2H |
| 27 | S-II-24 50 | b 20 | S-IV-2 86 | S-III-1 71 | g 4.8 | i 3.8 | 1,400 | 6.3 | 1,220 | 20 | 8.9 | HB |
| 28 | S-II-25 50 | a 23 | S-IV-3 100 | S-III-2 50 | f 4.8 | i 6.4 | 1,120 | 6.0 | 2,200 | 19 | 9.2 | H |
| 29 | S-II-26 50 | c 21 | S-IV-1 63 | S-III-6 93 | h 5.1 | j 10.8 | 1,190 | 6.6 | 1,810 | 17 | 8.9 | H |
| 30 | S-II-30 50 | b 26 | S-IV-4 57 | S-III-3 74 | e 4.2 | j 10.6 | 1,470 | 5.9 | 1,800 | 15 | 8.4 | 3H |
| 31 | S-II-27 50 | d 21 | S-IV-5 143 | S-III-7 133 | e 7.5 | i 6.3 | 1,260 | 6.3 | 1,450 | 13 | 8.6 | 2H |
| 32 | S-II-28 50 | a 26 | S-IV-6 133 | S-III-8 57 | e 5.7 | i 6.5 | 1,330 | 6.2 | 1,800 | 16 | 8.8 | 2H |
| 33 | S-II-29 50 | a 21 | S-IV-7 100 | S-III-9 100 | f 5.7 | j 5.9 | 1,330 | 5.7 | 1,900 | 15 | 8.6 | 2H |
| 34 | S-II-31 50 | b 20 | S-IV-1 62.5 | S-III-1 50 | e 4.1 | j 6.1 | 1,540 | 5.8 | 960 | 15 | 8.5 | 2H |

Notes
*1: Solvent
a: Ethylene glycol monoethyl ether
b: Isopropyl alcohol
c: Methyl ethyl ketone
d: Diacetone alcohol
*2: Catalyst
e: Dibutyltin laurate
f: tri-n-butyltin acetate
g: tin(II) acetate
h: Di-n-butyltin chloride
*3: Acid
i: Acetic acid
j: Lactic acid having a purity of 72%
k: Glycolic acid

EXAMPLE 35

Two coatings as obtained in Example 1 were prepared, and two diagonal cuts reaching the stainless steel were made in one of the coatings. Then the two coatings was subjected to a salt spray test by jetting salt water against the coatings for 750 hours and the performances of the coating having no diagonal cuts thereinto were measured and the results are as follows:

| | |
|---|---|
| Erichsen (mm)*1: | 7.6 |
| Du Pont Impact Strength (cm)*2: | 50 (satisfactory) |

-continued

| Crosscut Test (remainder/100)*3: | 100 |
|---|---|

Note
*1, *2 and *3: The same as in Example 1

On the other hand, when adhesive tapes were adhered along the cuts of the coating having two diagonal cuts and then peeled off, no coating was peeled off.

COMPARATIVE EXAMPLE 1

An electrolytic solution for electrodeposition having the following composition in the same manner as in Example 1.

| Block polyisocyanate (S-IV-1) | 125 g |
|---|---|
| Amine-modified epoxy compound (S-III-1) | 129 g |
| Catalyst: Dibutyltin dilaurate | 6.6 g |
| Acid: Lactic acid (purity 72%) | 8.9 g |
| Water | 1,540 ml |

Using the electrolytic solution, electrodeposition was conducted in the same manner as Example 1, and two diagonal cuts reaching the stainless steel were made in one of the obtained coating and then the same salt spray test as in Example 35 was conducted and the results are as follows:

| (i) | Coating having no diagonal cuts | |
|---|---|---|
| | Erichsen (mm)*1: | 6.0 |
| | Du Pont Impact Strength (cm)*2: (500 g × ½ inch) | 40 (unsatisfactory) |
| | Crosscut Test (remainder/100)*3 | 0 |
| (ii) | Coating having two diagonal cuts | |
| | Adhesive Peeling Test: | 6 mm peeled |

Note
*1, *2 and *3 are the same as in Example 1

EXAMPLE 36

In 15 g of ethylene glycol monoethyl ether were dissolved 50 g of the linear copolymer of S-II-1 under heating and 130 g of the block polyisocyanate and 90 g of the amine-modified epoxy compound of S-III-1 were further added thereto to give a homogeneous solution (hereinafter "Solution 36". To 40 g of dioxane were dissolved 10 g of the obtained solution, and the solution was coated on an aluminum plate by a coating rod. The obtained coating was heated at 175° C. for 30 minutes to give a transparent, uniform coating having the following properties.

| Thickness of Coating (μ): | 15 |
|---|---|
| Erichsen (mm)*1: | 7.2 |
| Du Pont Impact Strength (cm)*2: (500 g × ½ inch) | 50 (satisfactory) |

Note
*1 and *2 are the same as Example 1

Further, 100 g of the "Solution 36" was poured into a 10 mm×50 mm×100 mm metal mold and heated at 200° C. for 30 minutes to give a shaped article having smooth surfaces.

What is claimed is:

1. A nitrogen-containing acrylic copolymer composition comprising:

(i) a linear copolymer comprising about 2 to about 90% by weight of recurring units of Formula (A),

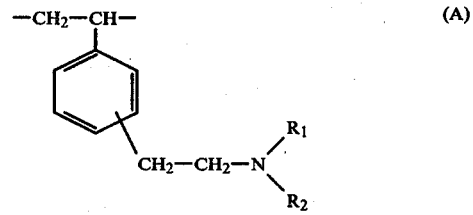

wherein
$R_1$ and $R_2$, which may be the same or different, each represents a hydrogen atom, a $C_{1-20}$ alkyl group, a $C_{3-10}$ cycloalkyl group, a $C_{3-8}$ alkenyl group, a $C_{1-15}$ aminoalkyl group, a $C_{6-20}$ aryl group or a $C_{7-12}$ arylalkyl group, based on the total weight of the linear copolymer, about 10 to about 98% by weight of recurring units of Formula (B),

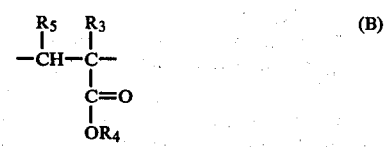

wherein
$R_3$ represents a hydrogen atom, a methyl group, a $C_{1-6}$ alkoxy group, a halogen atom or a —CH$_2$COOR$_6$ group wherein $R_6$ represents a hydrogen atom, a $C_{1-10}$ alkyl group or a $C_{7-12}$ arylalkyl group, $R_4$ represents a hydrogen atom, a $C_{1-20}$ alkyl group, a $C_{3-10}$ cycloalkyl group, a $C_{3-10}$ halocycloalkyl group, a $C_{6-20}$ aryl group, a $C_{6-20}$ haloaryl group, a $C_{7-12}$ arylalkyl group, a $C_{1-12}$ haloalkyl group, a $C_{1-12}$ hydroxyalkyl group, a $C_{2-12}$ alkoxyalkyl group, a tetrahydrofurfuryl group, a glycidyl group, a $+CH_2-CH-O)_mR_7$, wherein $R_7$ is a $C_{1-8}$ alkyl group and m is an integer of 1 to 30, or a $C_{3-20}$ dialkylaminoalkyl group, and $R_5$ represents a hydrogen atom or a —COOR$_8$ group wherein $R_8$ is a hydrogen atom or a $C_{1-20}$ alkyl group, based on the total weight of the linear copolymer and 0 to about 88% by weight of recurring units of at least one of Formulae (C$^1$), (C$^2$) and (C$^3$),

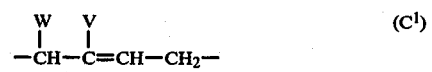

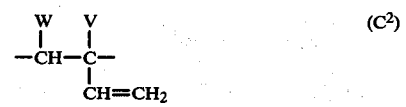

wherein
V and W each independently is a hydrogen atom, a $C_{1-8}$ alkyl group, a phenyl group or a halogen atom, based on the total weight of the linear copolymer, (ii) about 0.1 to about 10% by weight of an amine-modified epoxy compound where all or part of the epoxy group has been replaced by the unit of Formula (I),

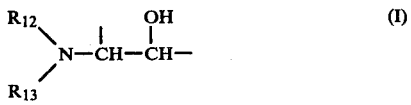

wherein $R_{12}$ and $R_{13}$ each independently is a hydrogen atom, a $C_{1-20}$ alkyl group, a $C_{3-10}$ cycloalkyl group, a $C_{1-12}$ hydroxyalkyl group, a $C_{1-15}$ aminoalkyl group, a $H\text{-}(NH\text{—}CH_2\text{—}CH_2)_{\overline{n}}$ wherein n is an integer of 1 to 8, a $C_{6-15}$ aryl group or a $C_7\text{-}12$ arylalkyl group, based on the weight of the linear copolymer and (iii) about 0.05 to about 12% by weight of a blocked polyisocyanate where all or part of the isocyanate groups has been replaced by an alcohol and/or an amine, based on the total weight of the linear copolymer.

2. The composition of claim 1, wherein one of $R_1$ and $R_2$ in the recurring units of Formula (A) is a hydrogen atom.

3. The composition of claim 1, wherein one of $R_1$ and $R_2$ in the recurring units of Formula (A) is a hydrogen atom and the other is a $C_{1-20}$ alkyl group.

4. The composition of claim 3, wherein the $C_{1-20}$ alkyl group is a $C_{1-8}$ alkyl group.

5. The composition of claim 4, wherein the $C_{1-8}$ alkyl group is an isopropyl group.

6. The composition of claim 1, wherein the

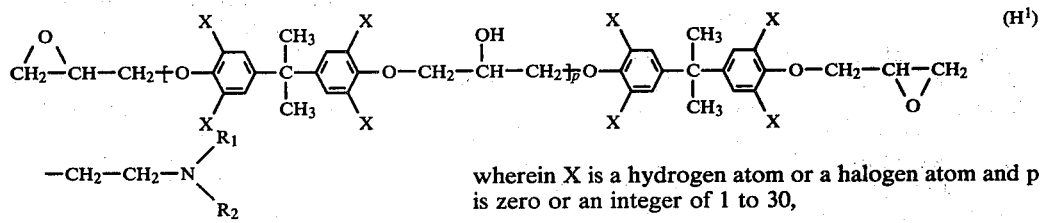

in the recurring units of Formula (A) is in the para position to the

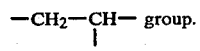 group.

7. The composition of claim 1, wherein $R_3$, $R_4$ and $R_5$ in the recurring units of Formula (B) are a hydrogen atom, a $C_{1-20}$ alkyl group and a hydrogen atom, respectively.

8. The composition of claim 1, wherein $R_3$, $R_4$ and $R_5$ in the recurring units of Formula (B) are a methyl group, a $C_{1-20}$ alkyl group and a hydrogen atom, respectively.

9. The composition of claim 1, wherein $R_3$, $R_4$ and $R_5$ in the recurring units of Formula (B) are a hydrogen atom, a $C_{1-12}$ hydroxyalkyl group and a hydrogen atom, respectively.

10. The composition of claim 1, wherein $R_3$, $R_4$ and $R_5$ in the recurring units of Formula (B) are a methyl group, a $C_{1-12}$ hydroxyalkyl group and a hydrogen atom, respectively.

11. The composition of claim 9, wherein the $C_{1-12}$ hydroxyalkyl group is a hydroxyethyl group.

12. The composition of claim 10, wherein the $C_{1-12}$ hydroxyalkyl group is a hydroxyethyl group.

13. The composition of claim 1, wherein $R_3$, $R_4$ and $R_5$ in the recurring units of Formula (B) are a hydrogen atom, a $C_{3-20}$ dialkylaminoalkyl group and a hydrogen atom, respectively.

14. The composition of claim 1, wherein $R_3$, $R_4$ and $R_5$ in the recurring units of Formula (B) are a methyl group, a $C_{3-20}$ dialkylaminoalkyl group and a hydrogen atom, respectively.

15. The composition of claim 13, wherein the $C_{3-20}$ dialkylaminoalkyl group is a diethylaminoethyl group.

16. The composition of claim 14, wherein the $C_{3-20}$ dialkylaminoalkyl group is a diethylaminoethyl group.

17. The composition of claim 1, wherein both V and W in the recurring units of at least one of Formulae $(C^1)$, $(C^2)$ and $(C^3)$ are hydrogen atoms.

18. The composition of claim 1, wherein V and W in the recurring units of at least one of Formulae $(C^1)$, $(C^2)$ and $(C^3)$ are a methyl group and a hydrogen atom, respectively.

19. The composition of claim 1, wherein V and W in the recurring units of at least one of Formulae $(C^1)$, $(C^2)$ and $(C^3)$ are a chlorine atom and a hydrogen atom, respectively.

20. The composition of claim 1, wherein the epoxy compound employed for preparing (ii) the amine-modified epoxy compound is an epoxy compound having at least two epoxy groups.

21. The composition of claim 20, wherein the epoxy compound is one member selected from the group consisting of:

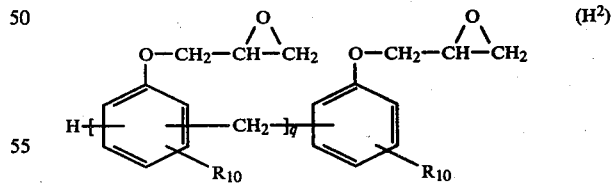

wherein X is a hydrogen atom or a halogen atom and p is zero or an integer of 1 to 30, $$O\text{—}CH_2\text{—}\underset{O}{\overset{}{CH\text{—}CH_2}} \quad O\text{—}CH_2\text{—}\underset{O}{\overset{}{CH\text{—}CH_2}} \quad (H^2)$$

wherein $R_{10}$ is a hydrogen atom or a $C_{1-6}$ alkyl group and q is an integer of 1 to 15, $$(CH_2\text{—}CH\text{—}CH_2\text{—}O\text{—}C)_{\overline{r}}Q \quad (H^3)$$

wherein Q is a $C_{1-15}$ aliphatic hydrocarbon group having a valence of r or a $C_{6-12}$ aromatic hydrocarbon group having a valence of r and r is an integer of 2 to 4,

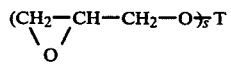 (H⁴)

wherein T is a $C_{6-20}$ aromatic hydrocarbon group having a valence of s, a $C_{2-20}$ aliphatic hydrocarbon group having a valence of s or a $C_{7-20}$ aryl-substituted aliphatic hydrocarbon group having a valence of s and s is an integer of 2 to 5,

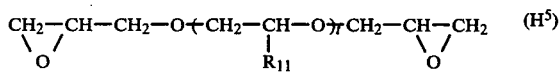 (H⁵)

wherein $R_{11}$ is a hydrogen atom or a methyl group and t is zero or an integer of 1 to 20,
and an epoxy compound obtained by replacing the —CH=CH— group in an alphatic polyene with

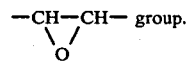 group.

22. The composition of claim 21, wherein X in the epoxy compound of Formula (H¹) is a hydrogen atom.

23. The composition of claim 1, wherein $R_{12}$ and $R_{13}$ in the unit of Formula (I) each independently is a $C_{1-20}$ alkyl group.

24. The composition of claim 23, wherein both $R_{12}$ and $R_{13}$ are ethyl groups.

25. The composition of claim 1, wherein both $R_{12}$ and $R_{13}$ in the unit of Formula (I) are $C_{1-12}$ hydroxyalkyl groups.

26. The composition of claim 25, wherein the $C_{1-12}$ hydroxyalkyl groups are hydroxyethyl groups or hydroxypropyl groups.

27. The composition of claim 1, wherein the polyisocyanate is a $C_{4-20}$ polyisocyanate alkane.

28. The composition of claim 27, wherein the $C_{4-20}$ polyisocyanate is hexamethylene diisocyanate.

29. The composition of claim 1, wherein the polyisocyanate is a $C_{8-20}$ polyisocyanate aromatic hydrocarbon.

30. The composition of claim 29, wherein the $C_{8-20}$ polyisocyanate aromatic hydrocarbon is a tolylene diisocyanate.

31. The composition of claim 1, wherein a $C_{1-20}$ aliphatic monoalcohol is employed as the blocking agent.

32. The composition of claim 31, wherein a $C_{4-10}$ aliphatic monoalcohol is employed as the blocking agent.

33. The composition of claim 1, wherein a $C_{2-20}$ polyol is employed as the blocking agent.

34. The composition of claim 33, wherein a $C_{3-10}$ polyol is employed as the blocking agent.

35. The composition of claim 1, wherein a $C_{1-20}$ aliphatic monoalcohol and a $C_{2-20}$ polyol are employed as the blocking agent.

36. A coating material comprising the composition of claim 1.

37. The coating material of claim 36 which is an electrocoating material capable of depositing at a cathode.

38. A cross-linked product obtained by the reaction of (i) the linear copolymer, (ii) the amine-modified epoxy compound and (iii) the blocked polyisocyanate of the composition of claim 1.

39. The cross-linked product of claim 38 which is a film.

40. A method of forming a coated film which comprises coating the composition of claim 1 on a material to be coated and hardening the coated composition.

41. A method of forming a coated film which comprises adding an acid to the composition of claim 1, dissolving or dispersing the obtained composition into water and conducting cathodic electrophoresis of the obtained solution or dispersion as an electrolytic solution onto an electroconductive material.

42. The method of claim 41, wherein the acid is a carboxylic acid.

43. The method of claim 41 which comprises hardening the coated film by heating.

44. The method of claim 43, wherein the temperature of heating is about 100° C. to about 250° C.

* * * * *